(12) United States Patent
Isoda et al.

(10) Patent No.: US 11,349,564 B2
(45) Date of Patent: May 31, 2022

(54) CROSSTALK ESTIMATION SYSTEM

(71) Applicant: NIPPON TELEGRAPH AND TELEPHONE CORPORATION, Tokyo (JP)

(72) Inventors: Akira Isoda, Tokyo (JP); Takayuki Mizuno, Tokyo (JP); Koki Shibahara, Tokyo (JP); Takayuki Kobayashi, Tokyo (JP); Yutaka Miyamoto, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/263,733

(22) PCT Filed: Aug. 15, 2019

(86) PCT No.: PCT/JP2019/032033
§ 371 (c)(1),
(2) Date: Jan. 27, 2021

(87) PCT Pub. No.: WO2020/040032
PCT Pub. Date: Feb. 27, 2020

(65) Prior Publication Data
US 2021/0376924 A1    Dec. 2, 2021

(30) Foreign Application Priority Data
Aug. 21, 2018 (JP) .............................. JP2018-154778

(51) Int. Cl.
*H04B 10/08* (2006.01)
*H04B 10/077* (2013.01)
(Continued)

(52) U.S. Cl.
CPC ......... *H04B 10/0775* (2013.01); *H04B 10/25* (2013.01); *H04J 14/06* (2013.01)

(58) Field of Classification Search
CPC .... H04B 10/0775; H04B 10/25; H04B 10/07; H04B 10/0795; H04B 10/5057;
(Continued)

(56) References Cited

U.S. PATENT DOCUMENTS

2017/0214485 A1* 7/2017 Yu ........................ H04J 14/0298
2018/0219578 A1* 8/2018 Giraldo .................... H04L 27/01

FOREIGN PATENT DOCUMENTS

JP      2016225899 A     12/2016

OTHER PUBLICATIONS

Amplification Characteristics of a Multi-core Erbium-doped Fiber Amplifier. Tsuchida et al. (Year: 2012).*

(Continued)

*Primary Examiner* — Hibret A Woldekidan
(74) *Attorney, Agent, or Firm* — Harness, Dickey & Pierce, P.L.C.

(57) ABSTRACT

A crosstalk estimation system includes: a light source unit that generates a polarization-multiplexed light, which is a polarized light having multiplexed polarizations, of each wavelength in a sideband of a modulated signal and emits the polarization-multiplexed light of each wavelength; a multiplexer that multiplexes the modulated signal with the polarization-multiplexed light for each core, which is associated with one of the wavelengths; a transmission line that transmits the modulated signal multiplexed with the polarization-multiplexed light of each wavelength through a different core; a separation unit that separates the polarization-multiplexed light from the modulated signal multiplexed with the polarization-multiplexed light for each core; a measurement unit that generates light intensity data on the (Continued)

polarization-multiplexed light of each wavelength; and an estimation unit that estimates a crosstalk between the cores based on a difference in light intensity between the polarization-multiplexed light of the wavelengths.

6 Claims, 19 Drawing Sheets

(51) Int. Cl.
*H04B 10/25* (2013.01)
*H04J 14/06* (2006.01)

(58) Field of Classification Search
CPC .............. H04B 10/532; H04B 10/6162; H04B 10/6163; H04B 1/0475; H04B 2210/07; H04B 3/32; H04B 10/6165; H04J 14/02; H04J 14/06; H03F 1/3294; H04L 25/024; H04L 25/03292

USPC ......... 398/25, 28, 65, 68, 79, 141, 143, 144, 398/152, 184, 205
See application file for complete search history.

(56) References Cited

OTHER PUBLICATIONS

K. Takenaga et al., "An Investigation on Crosstalk in Multi-Core Fibers by Introducing Random Fluctuation along Longitudinal Direction," IEICE Trans. Commun., vol. E94-B, No. 2, pp. 409-416, 2011.

Y. Tsuchida et al., "Amplification Characteristics of a Multi-core Erbium-doped Fiber Amplifier," in Proc. OFC/NFOEC2012, paper OM3C.3.

H. Ono et al., "Inter-core crosstalk measurement in multi-core fibre amplifier using multiple intensity tones," Electronics Letters, vol. 50, No. 14, pp. 1009-1010, 2014.

* cited by examiner

CROSSTALK ESTIMATION SYSTEM

CROSS-REFERENCE TO RELATED APPLICATIONS

This application is a 371 U.S. National Phase of International Application No. PCT/JP2019/032033 filed on Aug. 15, 2019, which claims priority to Japanese Application No. 2018-154778 filed on Aug. 21, 2018. The entire disclosures of the above applications are incorporated herein by reference.

TECHNICAL FIELD

The present invention relates to a crosstalk estimation system.

BACKGROUND ART

In recent years, broadband services over networks using optical fibers have been rapidly advanced, and the amount of communication are rapidly increasing. To cope with the rapid increase of the communication amount, the capacity of optical networks has been increased by increasing the capacity of optical communication systems by using the wavelength division multiplexing or the multi-level modulation format, rather than modifying the structure of optical fibers. The current high-capacity optical networks are based on the single-core fiber, which has one core serving as a channel (optical path) for optical signals. With the single-core fiber, optical networks capable of transmitting one terabit of data per second over a long distance have been realized.

As one of the technologies for increasing the capacity of the optical network, the space division multiplexing optical transmission technology, which uses a multi-core fiber that has a plurality of cores serving as channels for optical signals, are attracting attention. The transmittable capacity of one multi-core fiber increases in proportion to the number of the cores in the multi-core fiber.

Therefore, the research and development of the space division multiplexing optical transmission technology using the multi-core fiber are being rapidly advanced. In order to further increase the transmission capacity with the space division multiplexing optical transmission technology or introduce the space division multiplexing optical transmission technology to systems in practical use, an advanced optical relay, amplification and transmission system needs to be realized. Crosstalk (XT) between cores (referred to as an "inter-core crosstalk" hereinafter) is an index for evaluating the performance of the space division multiplexing optical transmission using the multi-core fiber. The inter-core crosstalk can be expressed by the difference between the intensity of the light transmitted in a core and the intensity of the light leaking to the core from the other cores. The difference in light intensity may be expressed as a ratio of light intensity (dB) using logarithm.

The transmission capacity of one multi-core fiber increases as the number of the cores in the multi-core fiber increases. However, the inter-core crosstalk increases as the number of the cores increases, since the distance between the cores in the cross section of the optical fiber decreases. The inter-core crosstalk also increases as the number of the cores to which each core is adjacent increases.

In the space division multiplexing optical transmission using the multi-core fiber, each core transmits an independent optical signal. Therefore, as the inter-core crosstalk increases, the optical signal deteriorates. As a result, the transmission distance of the optical signal decreases. In addition, the transmission capacity also decreases.

As the number of the levels of the modulation format of the optical signal to be transmitted increases, the optical signal is more likely to be affected by the inter-core crosstalk. Therefore, as the number of the levels of the modulation format of the optical signal to be transmitted increases, the transmission distance of the optical signal decreases.

As can be seen from the above description, the inter-core crosstalk is important in the transmission line including a multi-core fiber, a fan-in device, a fan-out device, a multi-core optical amplifier and the like. Non-Patent Literature 1 discloses a method of simply measuring an inter-core crosstalk using an evaluation system.

FIG. 15 is a diagram for illustrating a method of simply measuring an inter-core crosstalk using an evaluation system. On the input side of the multi-core fiber, light from a light source is input to one core in the multi-core fiber. On the output side of the multi-core fiber, the core in the multi-core fiber and the core of a single-core fiber are aligned with each other in advance.

If the core in the multi-core fiber to which the light is input and the core of the single-core fiber are aligned with each other, an optical power meter measures the light intensity that has attenuated by the transmission loss of each of the core in the multi-core fiber and the core of the single-core fiber. If a core in the multi-core fiber other than the core to which the light is input and the core of the single-core fiber are aligned with each other, the optical power meter measures the light intensity of the inter-core crosstalk.

For each case in which light is input to a different core in the multi-core fiber, the inter-core crosstalk is measured with the optical power meter. The crosstalk between two cores is determined based on the light intensity that has attenuated by the transmission loss of the core and the light intensity of the inter-core crosstalk (see Non-Patent Literature 1).

FIG. 16 is a diagram showing an example of a configuration of a system for measuring an inter-core crosstalk of a multi-core optical amplifier. Two signal light sources are provided for two cores between which the inter-core crosstalk is to be measured. With the wavelengths of the lights from the two signal light sources being set to be different from each other, an optical spectrum analyzer measures the inter-core crosstalk (see Non-Patent Literature 2).

FIG. 17 is a graph showing an example of an amplifier output spectrum, which shows an evaluation of the inter-core crosstalk measured by the optical spectrum analyzer. An optical signal of a wavelength of 1550 nm is input to a core A of a multi-core fiber amplifier. An optical signal of a wavelength of 1551 nm is input to a core B of the multi-core fiber amplifier. The crosstalk from the core B to the core A is estimated based on the measurement (spectrum) of the output from the core A. The crosstalk from the core A to the core B is estimated based on the measurement of the output from the core B.

FIG. 18 is a diagram for illustrating an example of a method of measuring an inter-core crosstalk using an intensity tone. Non-Patent Literature 3 discloses a method of measuring an inter-core crosstalk using an intensity tone. An optical signal modulated in light intensity with a different tone frequency for each core is incident on a measurement subject (such as a fan-in device, a fan-out device, an optical fiber for transmission, or an optical amplifier). A photoelectric transducer receives the light emitted from the measurement subject and converts the received light into an electric signal. An electrical spectrum analyzer detects each tone frequency component based on the electric signal, which is the result of the conversion.

FIG. 19 is a graph showing an example of the difference in level between the tone frequency components derived from an electrical spectrum. The crosstalk between the cores can be determined based on the difference in level between the tone frequency components (the difference in light intensity). However, the method of measuring the inter-core crosstalk disclosed in Non-Patent Literature 3 is a measurement method for an optical fiber, a device and an apparatus. Therefore, when an optical transmission system that performs the space division multiplexing optical transmission using the multi-core fiber is in operation (in service), it is difficult to evaluate the inter-core crosstalk (see Non-Patent Literature 3).

Patent Literature 1 proposes a method of estimating an inter-core crosstalk when an optical transmission system using a multi-core fiber is in operation (see Patent Literature 1).

FIG. 20 is a diagram for illustrating an example of a method of estimating an inter-core crosstalk when an optical transmission system using a multi-core fiber is in operation. In FIG. 20, optical signals of different wavelengths in a sideband of a signal band are incident on a core for which an inter-core crosstalk is to be measured and a core adjacent to the core.

CITATION LIST

Patent Literature

Patent Literature 1: Japanese Patent Laid-Open No. 2016-225899

Non-Patent Literature

Non-Patent Literature 1: K. Takenaga et al., "An Investigation on Crosstalk in Multi-Core Fibers by Introducing Random Fluctuation along Longitudinal Direction," IEICE Trans. Commun., vol. E94-B, no. 2, pp. 409-416, 2011

Non-Patent Literature 2: Y. Tsuchida et al., "Amplification Characteristics of a Multi-core Erbium-doped Fiber Amplifier," in Proc. OFC/NFOEC2012, paper OM3C.3

Non-Patent Literature 3: H. Ono et al., "Inter-core crosstalk measurement in multi-core fiber amplifier using multiple intensity tones," Electronics Letters, Volume 50, Issue 14, pp. 1009-1010, 2014

SUMMARY OF THE INVENTION

Technical Problem

However, the polarization of an optical signal being transmitted irregularly varies. Therefore, it has been difficult to accurately estimate an actual inter-core crosstalk occurring in the optical signal being transmitted. The polarization of the optical signal being transmitted irregularly varies because the polarization irregularly rotates in response to a bending or vibration of or a stress in the transmission line and thus the interference between the optical signals in adjacent cores varies.

FIG. 21 is a diagram showing an example of a variation of a polarization of an optical signal at points A, B and C in a transmission line using a 7-core multi-core fiber (MCF). The polarization of the optical signal being transmitted in the optical fiber rotates. At the point A at a time $t_0$, the polarization of the optical signal passing through a core #1 is oriented to a core #2, so that the signal interference of the core #1 with the core #2 is more significant than the signal interference of the core #1 with a core #3. Therefore, the crosstalk between the cores #1 and #2 is greater than the crosstalk between the cores #1 and #3.

The polarization of the optical signal at the point B is more significantly rotated than the polarization of the optical signal at the point A. At the point B at the time to, the polarization of the optical signal passing through the core #1 is oriented to the core #3, so that the signal interference of the core #1 with the core #3 is more significant than the signal interference of the core #1 with the core #2. Therefore, the crosstalk between the cores #1 and #3 is greater than the crosstalk between the cores #1 and #2.

At the point B at a time $t_1$, the polarization of the optical signal passing through the core #1 is oriented to the core #2 and a core #5. However, the pitch between the cores #1 and #5 is longer than the inter-core pitch between the cores #1 and #2. Therefore, the signal interference of the core #1 with the core #2 is more significant than the signal interference of the core #1 with the core #5. Therefore, the crosstalk between the cores #1 and #2 is greater than the crosstalk between the cores #1 and #5.

The variations in inter-core distance in the cross section of the multi-core fiber are due to the fabrication precision of the multi-core fiber and therefore vary depending on the point along the longitudinal direction of the multi-core fiber. Therefore, in order for a crosstalk estimation system to estimate an inter-core crosstalk with higher precision, the number of the polarizations is preferably the same as the number of the optical signals transmitted.

As described above, conventional crosstalk estimation systems may be unable to estimate a crosstalk between cores in a multi-core fiber with higher precision when an optical transmission system using the multi-core fiber is in operation.

In view of the circumstances described above, an object of the present invention is to provide a crosstalk estimation system that can estimate a crosstalk between cores in a multi-core fiber with higher precision when an optical transmission system using the multi-core fiber is in operation.

Means for Solving the Problem

An aspect of the present invention is a crosstalk estimation system including: a light source unit that generates a polarization-multiplexed light, which is a polarized light having multiplexed polarizations, of each wavelength in a sideband of a modulated signal and emits the polarization-multiplexed light of each wavelength; a multiplexer that multiplexes the modulated signal with the polarization-multiplexed light for each core, which is associated with one of the wavelengths; a transmission line that transmits the modulated signal multiplexed with the polarization-multiplexed light of each wavelength through a different core; a separation unit that separates the polarization-multiplexed light from the modulated signal multiplexed with the polarization-multiplexed light for each core; a measurement unit that generates light intensity data on the polarization-multiplexed light of each wavelength; and an estimation unit that estimates a crosstalk between the cores based on a difference in light intensity between the polarization-multiplexed lights of the wavelengths.

An aspect of the present invention is the crosstalk estimation system described above, in which the measurement unit generates a time average value of the light intensity of the polarization-multiplexed light for each of the wavelengths, and the estimation unit estimates a crosstalk between the cores based on a difference in time average value of the light intensity between the polarization-multiplexed lights of the wavelengths.

An aspect of the present invention is the crosstalk estimation system described above, in which the light source unit generates both a polarization-multiplexed light of a wavelength in an upper sideband of the modulated signal and a polarization-multiplexed light of a wavelength in a lower sideband of the modulated signal.

An aspect of the present invention is a crosstalk estimation system including: a light source unit that generates a polarization-multiplexed light, which is a polarized light having multiplexed polarizations, and emits the polarization-multiplexed light; a multiplexer that multiplexes a modulated signal with the polarization-multiplexed light for each core, which is associated with a different transmission period; a transmission line that transmits the modulated signal multiplexed with the polarization-multiplexed light through a different core in each transmission period; a separation unit that separates the polarization-multiplexed light from the modulated signal multiplexed with the polarization-multiplexed light for each core; a measurement unit that generates light intensity data on the polarization-multiplexed light for each transmission period; and an estimation unit that estimates a crosstalk between the cores in each estimation period having a length of time that is an integer multiple of the transmission period based on a difference in light intensity between the polarization-multiplexed lights in the transmission periods.

An aspect of the present invention is the crosstalk estimation system described above, in which the light source unit generates a polarization-multiplexed light for each of different wavelengths in a sideband of the modulated signal, and the estimation unit estimates a crosstalk between the cores in each estimation period based on a difference in light intensity between the polarization-multiplexed light of the wavelengths and a different in light intensity between the polarization-multiplexed lights in the transmission periods.

An aspect of the present invention is the crosstalk estimation system described above, in which the light source unit generates both a polarization-multiplexed light of a wavelength in an upper sideband of the modulated signal and a polarization-multiplexed light of a wavelength in a lower sideband of the modulated signal.

Effects of the Invention

According to the present invention, the precision of estimation of a crosstalk between cores in a multi-core fiber while an optical transmission system using the multi-core fiber is in operation can be improved.

DESCRIPTION OF EMBODIMENTS

Embodiments of the present invention will be described in detail with reference to the drawings.

First Embodiment

Figure 1:
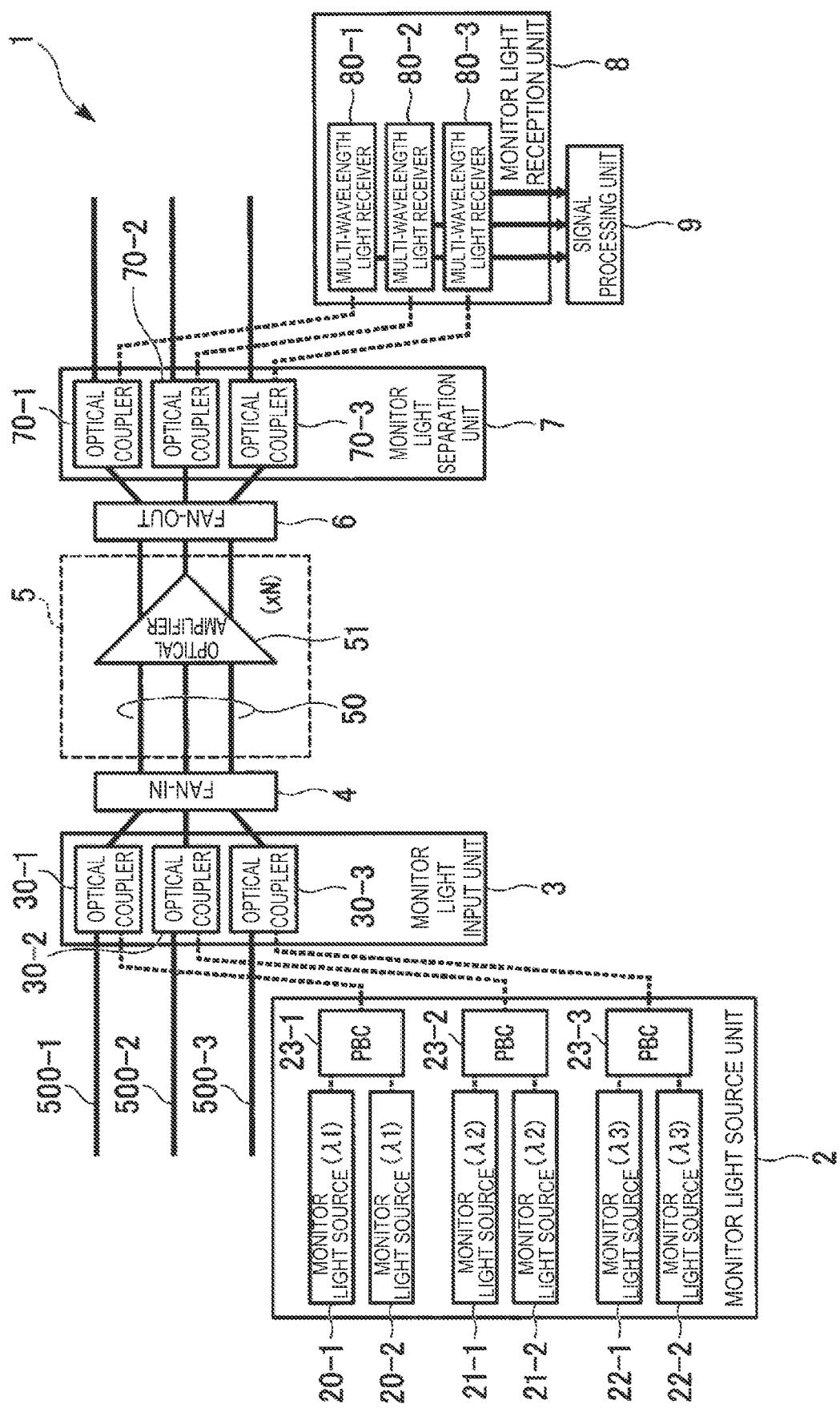
FIG. 1 is a diagram showing an example of a configuration of a crosstalk estimation system according to a first embodiment.

FIG. 1 is a diagram showing an example of a configuration of a crosstalk estimation system 1. The crosstalk estimation system 1 is a system that estimates a crosstalk. The crosstalk estimation system 1 estimates a crosstalk in a transmission line previously determined to be a monitoring section. The crosstalk estimation system 1 includes a monitor light source unit 2, a monitor light input unit 3, a fan-in 4, a transmission line 5, a fan-out 6, a monitor light separation unit 7, a monitor light reception unit 8 and a signal processing unit 9.

The monitor light source unit 2 includes monitor light sources 20-1 and 20-2, monitor light sources 21-1 and 21-2, monitor light sources 22-1 and 22-2 and PBCs 23-1 to 23-3. The monitor light sources 20, the monitor light sources 21 and the monitor light sources 22 are light sources of a single-polarized continuous wave (CW).

Each monitor light source 20 emits a polarized light (of a wavelength λ1) to the PBC 23-1. Thus, the two monitor light sources 20 emit a polarized light having multiplexed polarizations (referred to as a "polarization-multiplexed light" hereinafter) to the PBC 23-1 as a monitor light.

Each monitor light source 21 emits a polarized light (of a wavelength λ2) to the PBC 23-1. Thus, the two monitor light sources 21 emit a polarization-multiplexed light (of a wavelength λ2) to the PBC 23-2 as a monitor light.

Each monitor light source 22 emits a polarized light (of a wavelength λ3) to the PBC 23-3. Thus, the two monitor light sources 22 emit a polarization-multiplexed light (of a wavelength λ3) to the PBC 23-3 as a monitor light.

Figure 2:
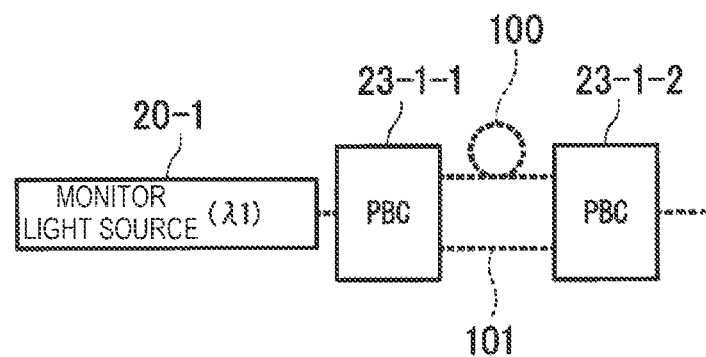
FIG. 2 is a diagram showing a first example of other configurations of a monitor light source unit according to the first embodiment.

FIG. 2 is a diagram showing a first example of other configurations of the monitor light source unit 2. Instead of the monitor light sources 20-1 and 20-2 and the PBC 23-1, the monitor light source unit 2 may include the monitor light source 20-1, a PBC 23-1-1, a delay line 100 and an optical fiber 101. The delay line 100 delays an optical signal. The optical fiber 101 transmits an optical signal. The monitor light sources 21-1 and 21-2 and the PBC 23-2 and the monitor light sources 22-1 and 22-2 and the PBC 23-3 can also be similarly replaced.

Figure 3:
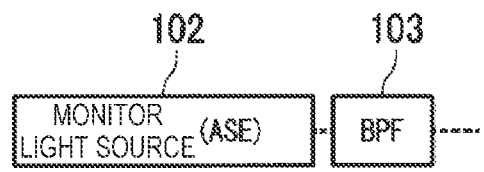
FIG. 3 is a diagram showing a second example of other configurations of the monitor light source unit according to the first embodiment.

FIG. 3 is a diagram showing a second example of other configurations of the monitor light source unit 2. Instead of the monitor light sources 20-1 and 20-2 and the PBC 23-1, the monitor light source unit 2 may include a monitor light source 102 and a BPF 103. The monitor light sources 21-1 and 21-2 and the PBC 23-2 and the monitor light sources 22-1 and 22-2 and the PBC 23-3 can also be similarly replaced. The monitor light source 102 is an amplified spontaneous emission (ASE) light source. The monitor light source 102 amplifies and emits a spontaneous emission light. The BPF 103 is a band-pass filter.

Figure 4:
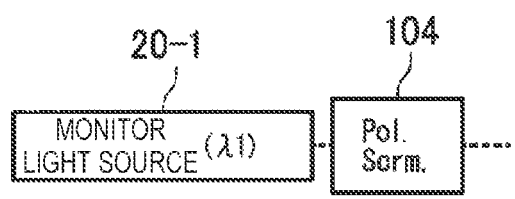
FIG. 4 is a diagram showing a third example of other configurations of the monitor light source unit according to the first embodiment.

FIG. 4 is a diagram showing a third example of other configurations of the monitor light source unit 2. Instead of the monitor light sources 20-1 and 20-2 and the PBC 23-1, the monitor light source unit 2 may include a monitor light source 20-1 and a Pol.scrm 104. The monitor light sources 21-1 and 21-2 and the PBC 23-2 and the monitor light sources 22-1 and 22-2 and the PBC 23-3 can also be similarly replaced. The Pol.scrm 104 is a polarization scrambler.

Referring back to FIG. 1, the description of the example of the configuration of the crosstalk estimation system 1 will be resumed. The PBC 23 is a polarization beam multiplexer. The PBC 23-1 receives the polarized light (of the wavelength λ1) emitted by the monitor light source 20-1 and the polarized light (of the wavelength λ1) emitted by the monitor light source 20-2 as a polarization-multiplexed light M1 (of the wavelength λ1) while maintaining the polarization of each polarized light. The wavelength λ1 is a wavelength different from the wavelength of a modulated optical signal in a core 500-1 (that is, a wavelength in a sideband of the signal band). The PBC 23-1 emits the polarization-multiplexed light M1 to the monitor light input unit 3. The polarization-multiplexed light M1 propagates through the core 500-1 in the transmission line 5.

The PBC 23-2 receives the polarized light (of the wavelength λ2) emitted by the monitor light source 20-1 and the polarized light (of the wavelength λ2) emitted by the monitor light source 20-2 as a polarization-multiplexed light M2 (of the wavelength λ2) while maintaining the polarization of each polarized light. The wavelength λ2 is a wavelength different from the wavelength of a modulated optical signal in a core 500-2 (that is, a wavelength in a sideband of the signal band). The PBC 23-2 emits the polarization-multiplexed light M2 to the monitor light input unit 3. The polarization-multiplexed light M2 propagates through the core 500-2 in the transmission line 5.

The PBC 23-3 receives the polarized light (of the wavelength λ3) emitted by the monitor light source 20-1 and the polarized light (of the wavelength λ3) emitted by the monitor light source 20-2 as a polarization-multiplexed light M3 (of the wavelength λ3) while maintaining the polarization of each polarized light. The wavelength λ3 is a wavelength different from the wavelength of a modulated optical signal in a core 500-3 (that is, a wavelength in a sideband of the signal band). The PBC 23-3 emits the polarization-multiplexed light M3 to the monitor light input unit 3. The polarization-multiplexed light M3 propagates through the core 500-3 in the transmission line 5.

The modulation format for the modulated optical signal (modulated signal) in each core 500 is not limited to a particular modulation format baud rate or multi-level modulation. The modulation format is 40WDM (WDM: wavelength division multiplexing) at a 100-GHz interval, 32Gbaud PDM-16QAM, 80WDM at a 50-GHz interval, or 48Gbaud PDM-64QAM, for example.

The monitor light input unit 3 multiplexes a modulated signal (such as a WDM signal) to be incident on the fan-in 4 with the polarization-multiplexed light emitted from the monitor light source unit 2. The monitor light input unit 3 includes a plurality of optical couplers 30, and the number of the optical couplers 30 is equal to or greater than 2 and equal to or smaller than the number of the cores. In FIG. 1, the monitor light input unit 3 includes optical couplers 30-1 to 30-3. The optical coupler 30-1 multiplexes the modulated signal to be incident on the fan-in 4 through the core 500-1 with the polarization-multiplexed light M1 emitted from the PBC 23-1. The optical coupler 30-2 multiplexes the modulated signal to be incident on the fan-in 4 through the core 500-2 with the polarization-multiplexed light M2 emitted from the PBC 23-2. The optical coupler 30-3 multiplexes the modulated signal to be incident on the fan-in 4 through the core 500-3 with the polarization-multiplexed light M3 emitted from the PBC 23-3.

The crosstalk estimation system 1 may include a plurality of WDM couplers as the monitor light input unit 3 before the fan-in 4 along the direction of transmission of the optical signal. The fan-in 4 may multiplex the modulated signal with the polarization-multiplexed light emitted from the PBC 23.

The fan-in 4 emits each modulated signal multiplexed with a polarization-multiplexed light to the transmission line 5. The fan-in 4 includes a plurality of ferrules and a plurality of single-core fibers, for example.

In the optical transmission system, the transmission line 5 is a measurement subject (a relay and amplification transmission line) that has a multi-core fiber having two or more cores and a multi-core optical amplifier and is a monitoring section for an inter-core crosstalk. In FIG. 1, the transmission line 5 includes a multi-core fiber 50 having cores 500-1 to 500-3 and an optical amplifier 51, as an example.

The transmission line 5 may be configured as described in (1) to (3) below. In the following, the set of the fan-in, the relay and amplification transmission line having a plurality of multi-core fibers and a multi-core optical amplifier and the fan-out will be referred to as a "multi-core optical amplification and relay transmission line".

(1) Only a multi-core fiber.
(2) Only an optical amplifier.
(3) Only a section of the transmission line is formed as a multi-core optical amplification and relay transmission line.

In the case (3) above, the transmission line may be any of the transmission lines (3-1) to (3-3) described below:

(3-1) a transmission line formed by a multi-core optical amplification and relay transmission line and a plurality of single-core fiber sections connected to each other;
(3-2) a transmission line formed by a multi-core fiber and a plurality of single core optical amplifiers; and
(3-3) a transmission line formed by a plurality of single-core fibers and a multi-core optical amplifier connected to each other.

The multi-core fiber 50 includes the cores 500-1 to 500-3. The multi-core fiber 50 transmits a modulated signal multiplexed with a polarization-multiplexed light. The optical amplifier 51 amplifies the light intensity of the modulated signal multiplexed with the polarization-multiplexed light in the multi-core fiber 50.

The fan-out 6 emits each modulated signal (WDM signal) multiplexed with a polarization-multiplexed light to the monitor light separation unit 7. The fan-out 6 includes a plurality of ferrules and a plurality of single-core fibers, for example.

The monitor light separation unit 7 separates the polarization-multiplexed light from each modulated signal. The monitor light separation unit 7 includes a plurality of optical couplers 70, and the number of the optical couplers 70 is equal to or greater than 2 and equal to or smaller than the number of the cores. In FIG. 1, the monitor light separation unit 7 includes optical couplers 70-1 to 70-3.

The optical coupler 70-1 separates the polarization-multiplexed light M1 from the modulated signal multiplexed with the polarization-multiplexed light M1 emitted from the fan-out 6 through the core 500-1. The optical coupler 70-1 emits the separated polarization-multiplexed light M1 to the monitor light reception unit 8. The optical coupler 70-2 separates the polarization-multiplexed light M2 from the modulated signal multiplexed with the polarization-multiplexed light M2 emitted from the fan-out 6 through the core 500-2. The optical coupler 70-2 emits the separated polarization-multiplexed light M2 to the monitor light reception unit 8. The optical coupler 70-3 separates the polarization-multiplexed light M3 from the modulated signal multiplexed with the polarization-multiplexed light M3 emitted from the fan-out 6 through the core 500-3. The optical coupler 70-3 emits the separated polarization-multiplexed light M3 to the monitor light reception unit 8.

The crosstalk estimation system 1 may include a plurality of WDM couplers as the monitor light separation unit 7 before the fan-out 6 along the direction of transmission of the optical signal. The fan-out 6 may separate the polarization-multiplexed light emitted from the transmission line 5 from the modulated signal multiplexed with the polarization-multiplexed light.

The monitor light reception unit 8 receives a plurality of polarization-multiplexed lights of different wavelengths from the monitor light separation unit 7. The monitor light reception unit 8 includes a multi-wavelength light receiver 80 for each core 500. In FIG. 1, the monitor light reception unit 8 includes multi-wavelength light receivers 80-1 to 80-3.

Some of the modulated signal multiplexed with the polarization-multiplexed light leaks from a core 500 to another core 500 in the transmission line 5. Therefore, when each modulated signal multiplexed with a polarization-multiplexed light in each core 500 reaches the monitor light separation unit 7, the modulated signal contains the polarization-multiplexed light M1 of the wavelength $\lambda 1$, the polarization-multiplexed light M2 of the wavelength $\lambda 2$ and the polarization-multiplexed light M3 of the wavelength $\lambda 3$.

The multi-wavelength light receiver 80 receives a plurality of polarization-multiplexed lights of different wavelengths from the monitor light separation unit 7. In FIG. 1, the multi-wavelength light receiver 80-1 receives the polarization-multiplexed light M1, the polarization-multiplexed light M2 and the polarization-multiplexed light M3 transmitted through the core 500-1. The multi-wavelength light receiver 80-2 receives the polarization-multiplexed light M1, the polarization-multiplexed light M2 and the polarization-multiplexed light M3 transmitted through the core 500-2. The multi-wavelength light receiver 80-3 receives the polarization-multiplexed light M1, the polarization-multiplexed light M2 and the polarization-multiplexed light M3 transmitted through the core 500-3.

The multi-wavelength light receiver 80-1 measures the light intensity of each of the polarization-multiplexed light M1, the polarization-multiplexed light M2 and the polarization-multiplexed light M3 transmitted through the core 500-1. The multi-wavelength light receiver 80-1 outputs the measurements of the light intensity of the polarization-multiplexed light M1, the polarization-multiplexed light M2 and the polarization-multiplexed light M3 transmitted through the core 500-1 to the signal processing unit 9.

The multi-wavelength light receiver 80-2 measures the light intensity of each of the polarization-multiplexed light M1, the polarization-multiplexed light M2 and the polarization-multiplexed light M3 transmitted through the core 500-2. The multi-wavelength light receiver 80-2 outputs the measurements of the light intensity of the polarization-multiplexed light M1, the polarization-multiplexed light M2 and the polarization-multiplexed light M3 transmitted through the core 500-2 to the signal processing unit 9.

The multi-wavelength light receiver 80-3 measures the light intensity of each of the polarization-multiplexed light M1, the polarization-multiplexed light M2 and the polarization-multiplexed light M3 transmitted through the core 500-3. The multi-wavelength light receiver 80-3 outputs the measurements of the light intensity of the polarization-multiplexed light M1, the polarization-multiplexed light M2 and the polarization-multiplexed light M3 transmitted through the core 500-3 to the signal processing unit 9.

The signal processing unit 9 (crosstalk estimation unit) is a functional unit that performs a signal processing related to estimation of a crosstalk. The signal processing unit 9 is implemented by a processor such as a central processing unit (CPU) executing a program stored in a storage unit. The signal processing unit 9 may be implemented by a hardware such as a large scale integration (LSI) or an application specific integrated circuit (ASIC). The signal processing unit 9 may include a storage unit.

The storage unit has a nonvolatile recording medium (non-temporary recording medium) such as a flash memory or a hard disk drive (HDD). The storage unit may have a volatile recording medium such as a random access memory (RAM) or a register, for example.

The signal processing unit 9 obtains the measurement of the light intensity of the polarization-multiplexed light for each core 500 from the monitor light reception unit 8. The signal processing unit 9 estimates a crosstalk between the cores 500 based on the measurements of the light intensity of the polarization-multiplexed lights.

The signal processing unit 9 estimates a crosstalk between two cores 500 in the multi-core fiber 50. The signal processing unit 9 calculates the difference in light intensity of the polarization-multiplexed light between the two cores 500 in the multi-core fiber 50 as a crosstalk between the cores 500. That is, the signal processing unit 9 calculates the ratio (in dB) between the light intensities of the polarization-multiplexed lights for the two cores 500 in the multi-core fiber 50 as the crosstalk between the cores 500.

The signal processing unit 9 measures the light intensity of the polarization-multiplexed light M1 of the wavelength λ1, the light intensity of the polarization-multiplexed light M2 of the wavelength λ2 and the light intensity of the polarization-multiplexed light M2 of the wavelength λ3. The light intensity of each polarization-multiplexed light received by the multi-wavelength light receiver 80 varies with time. Therefore, the signal processing unit 9 calculates a sectional average value in the temporal direction for light intensity data (raw data) obtained from the monitor light reception unit 8 for a certain time. The certain time is a time equal to or longer than a half of the duration of one frame of the modulated optical signal (modulated signal), for example.

The signal processing unit 9 calculates the crosstalk between the cores 500 based on the sectional average value of the light intensity in the temporal direction (time average data). The signal processing unit 9 estimates the crosstalk between the two cores 500 in the multi-core fiber 50 based on the difference in sectional average value of the light intensity in the temporal direction between the cores 500.

Figure 5:
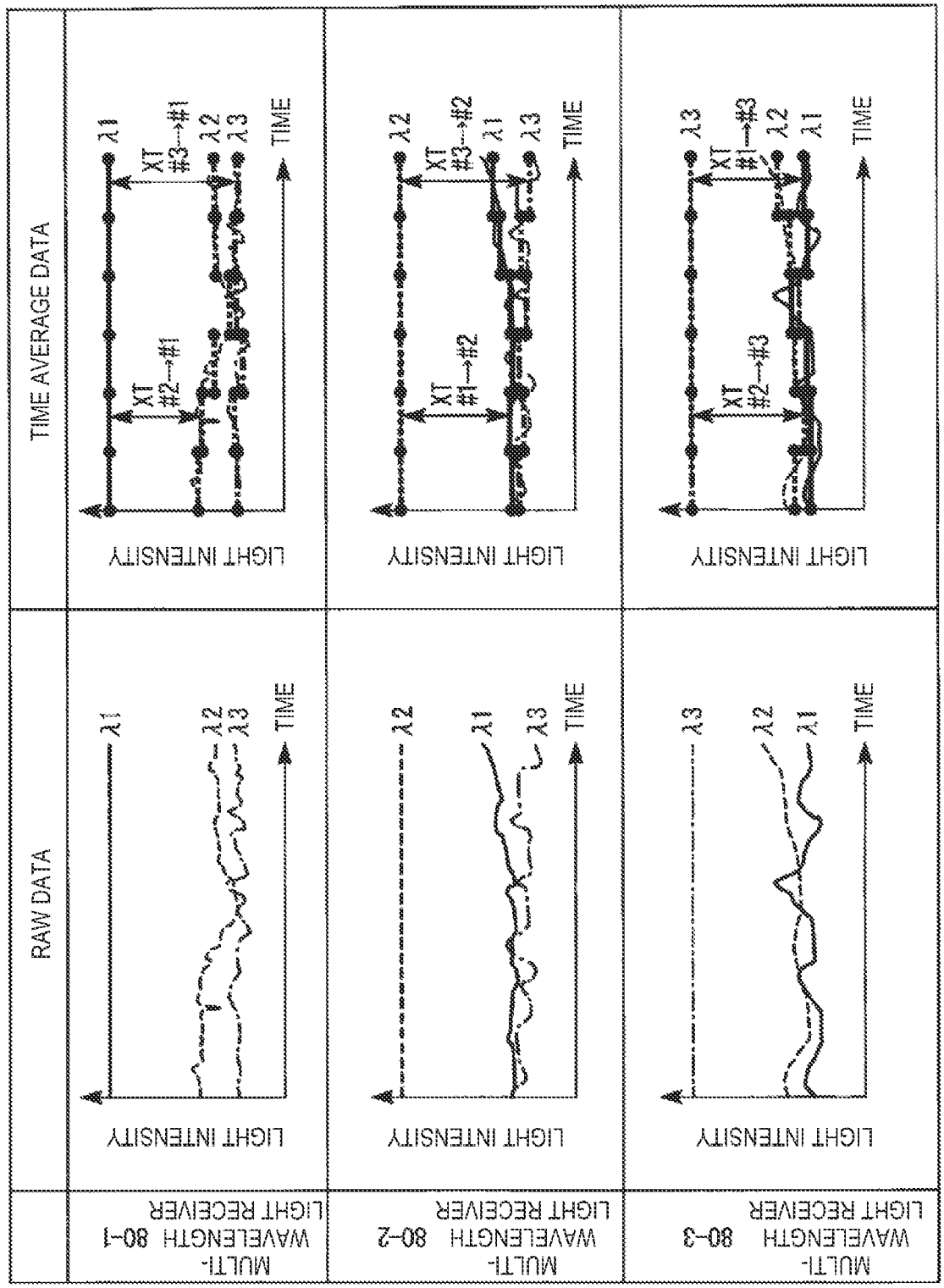
FIG. 5 is a diagram for illustrating an example of a method of estimating a crosstalk according to the first embodiment.

FIG. 5 is a diagram for illustrating an example of a method of estimating a crosstalk. In FIG. 5, "#1" denotes the core 500-1. "#2" denotes the core 500-2. "#3" denotes the core 500-3. In FIG. 5, "XT #2→#1" denotes the difference (level difference) between the light intensity of the monitor light in the core 500-1 and the light intensity of the monitor light in the core 500-2. That is, "XT #2→#1" denotes the amount of the crosstalk from the core 500-2 to the core 500-1. In FIG. 5, "XT #3→#1" denotes the difference (level difference) between the light intensity of the monitor light in the core 500-1 and the light intensity of the monitor light in the core 500-3 caused by the crosstalk from the core 500-3 to the core 500-1. That is, "XT #3→#1" denotes the amount of the crosstalk from the core 500-3 to the core 500-1. The other annotations have similar meanings.

The signal processing unit 9 may estimate the crosstalk between the two cores 500 in the multi-core fiber 50 based on the ratio (in dB) of the sectional average value of the light intensity in the temporal direction between the cores 500. For example, the signal processing unit 9 estimate a crosstalk $\alpha_{nm}$ from a core 500-$n$ ($n$ denotes an integer that identifies any of the cores 500-1 to 500-3) to a core 500-$m$ ($m$ is an integer different from n that identifies any of the cores 500-1 to 500-3) according to the formula (1).

$$\alpha_{nm}=10\log_{10}(In/Im) \qquad (1)$$

In this formula, "Im" denotes the light intensity measured in the core 500-$m$, that is, the light intensity of the polarization-multiplexed light (of a wavelength λm) transmitted in the core 500-$m$. "In" denotes the light intensity measured in the core 500-$m$, that is, the light intensity of the polarization-multiplexed light (of a wavelength λn) transmitted in the core 500-$n$.

The signal processing unit 9 estimates the crosstalk in any one of the cores 500 in the multi-core fiber 50 from the plurality of other cores 500 by summing the intensities (crosstalks) of the light leaking from the other cores 500 to the one core 500. For example, the signal processing unit 9 sums the difference in time average data of the light intensity in the core 500-1 between the polarization-multiplexed light M1 and the polarization-multiplexed light M2 over a certain period and the difference in time average data of the light intensity in the core 500-1 between the polarization-multiplexed light M1 and the polarization-multiplexed light M3 over the same period. The signal processing unit 9 estimates the crosstalk to the core 500-1 from the other cores 500 by summing the differences in light intensity over the same period.

As described above, the crosstalk estimation system 1 according to the first embodiment includes the monitor light source unit 2 (light source unit), the monitor light input unit 3 (multiplexer), the transmission line 5, the monitor light separation unit 7 (separation unit), the monitor light reception unit 8 (measurement unit), and the signal processing unit 9 (estimation unit). The monitor light source unit 2 generates a polarization-multiplexed light of each wavelength of the sideband of the modulated signal and emits the polarization-multiplexed light of each wavelength. The monitor light input unit 3 multiplexes the modulated signal with the polarization-multiplexed light for each core 500, which is associated with one of the wavelengths. The transmission line 5 transmits the modulated signal multiplexed with the polarization-multiplexed light of each wavelength through a different core 500. The monitor light separation unit 7 separates the polarization-multiplexed light from the modulated signal multiplexed with the polarization-multiplexed light for each core 500. The monitor light reception unit 8 generates light intensity data on the polarization-multiplexed light of each wavelength. The signal processing unit 9 estimates the crosstalk between the cores 500 based on the difference in light intensity between the polarization-multiplexed lights of the wavelengths.

Thus, when the optical transmission system using the multi-core fiber is in operation, the crosstalk estimation system 1 according to the first embodiment can estimate the crosstalk between the cores in the multi-core fiber with improved precision.

Even if the polarizations irregularly rotate and the interference of the optical signal between adjacent cores varies in response to a bending or a vibration of or a stress in the transmission line 5, the crosstalk estimation system 1 according to the first embodiment can estimate the crosstalk between the cores 500 with improved precision.

The monitor light reception unit 8 may generate the time average value of the light intensity of the polarization-multiplexed light of each wavelength. The signal processing unit 9 may estimate the crosstalk between the cores 500 based on the difference in time average value of the light intensity between the polarization-multiplexed lights of the wavelengths.

Second Embodiment

A second embodiment differs from the first embodiment in configuration of the monitor light separation unit 7 and configuration of the monitor light reception unit 8. The second embodiment will be described, focusing on the difference from the first embodiment.

Figure 6:
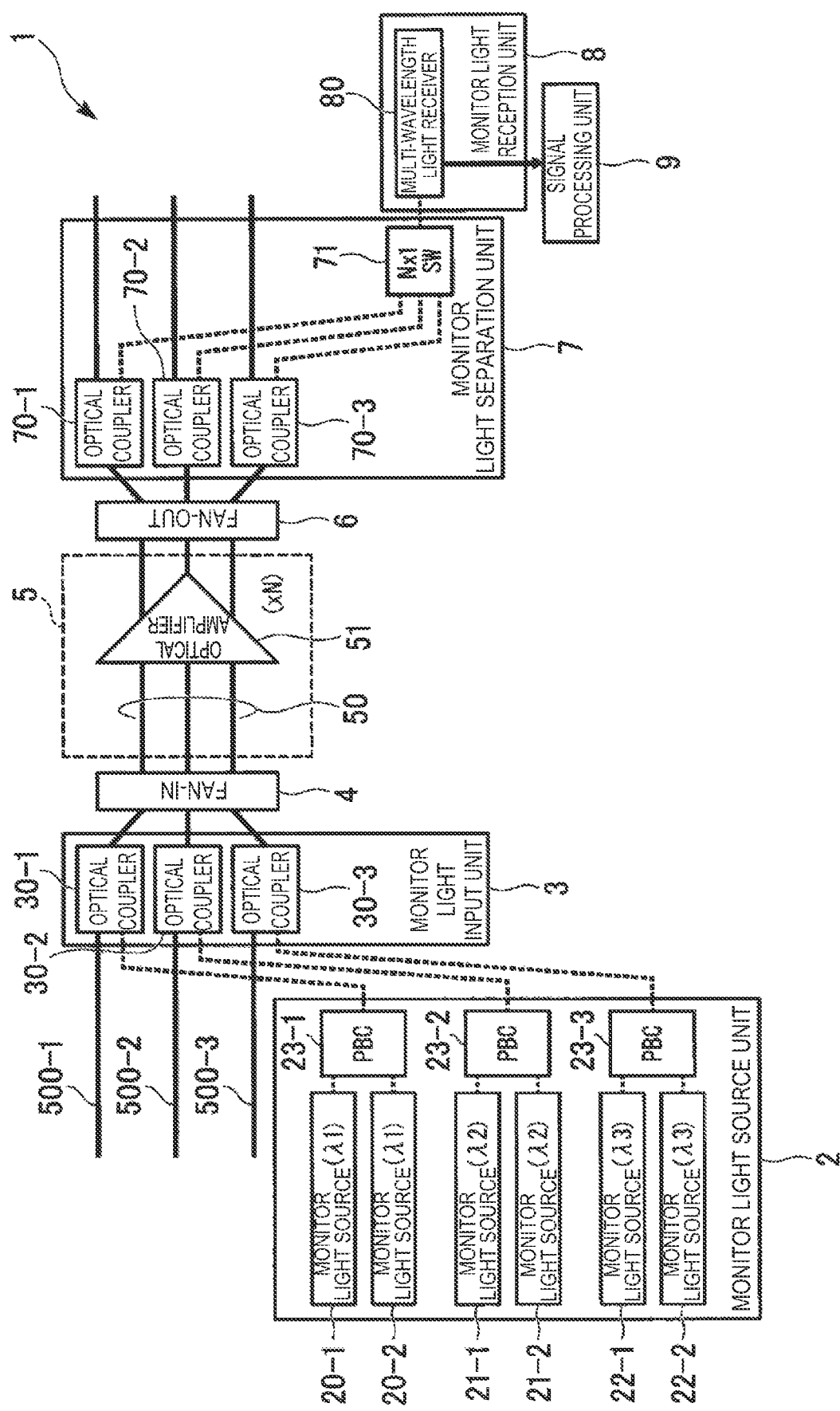
FIG. 6 is a diagram showing an example of a configuration of a crosstalk estimation system according to a second embodiment.

FIG. 6 is a diagram showing an example of the configuration of the crosstalk estimation system 1. The monitor light separation unit 7 includes a plurality of optical couplers 70 and an N×1 SW 71, and the number of the optical couplers 70 is equal to or greater than 2 and equal to or smaller than the number of the cores. The N×1 SW 71 is a switch that has N inputs for polarization-multiplexed light and one output for polarization-multiplexed light (N denotes the number of the cores 500). The N×1 SW 71 selects one polarization-multiplexed light from the polarization-multiplexed lights output from the optical couplers 70-1 to 70-3 and changes the polarization-multiplexed light to be selected depending on the elapsed time. That is, the N×1 SW 71 selects an optical coupler 70 from the optical couplers 70-1 to 70-3 and changes the optical coupler 70 to be selected depending on the elapsed time. The N×1 SW 71 may change the selection each time a period having a length of T elapses. The N×1 SW 71 emits the polarization-multiplexed light emitted from the selected optical coupler 70 to the monitor light reception unit 8.

The monitor light reception unit 8 includes a multi-wavelength light receiver 80. The multi-wavelength light receiver 80 receives the polarization-multiplexed light M1, the polarization-multiplexed light M2 and the polarization-multiplexed light M3 transmitted in the core 500-1 from the monitor light separation unit 7 for a period from a time 0 (inclusive) to a time T (exclusive). The multi-wavelength light receiver 80 receives the polarization-multiplexed light M1, the polarization-multiplexed light M2 and the polarization-multiplexed light M3 transmitted in the core 500-2 from the monitor light separation unit 7 for a period from the time T (inclusive) to a time 2T (exclusive). The multi-wavelength light receiver 80 receives the polarization-multiplexed light M1, the polarization-multiplexed light M2 and the polarization-multiplexed light M3 transmitted in the core 500-3 from the monitor light separation unit 7 for a period from the time 2T (inclusive) to a time 3T (exclusive). The multi-wavelength light receiver 80 measures the light intensity of each polarization-multiplexed light in each period.

The multi-wavelength light receiver 80 outputs the measurement of the light intensity of each polarization-multiplexed light to the signal processing unit 9.

Since the N×1 SW 71 selects the polarization-multiplexed light or optical coupler 70, the signal processing unit 9 can estimate the crosstalk between the plurality of cores 500 even if the monitor light reception unit 8 includes only one multi-wavelength light receiver 80.

Figure 7:
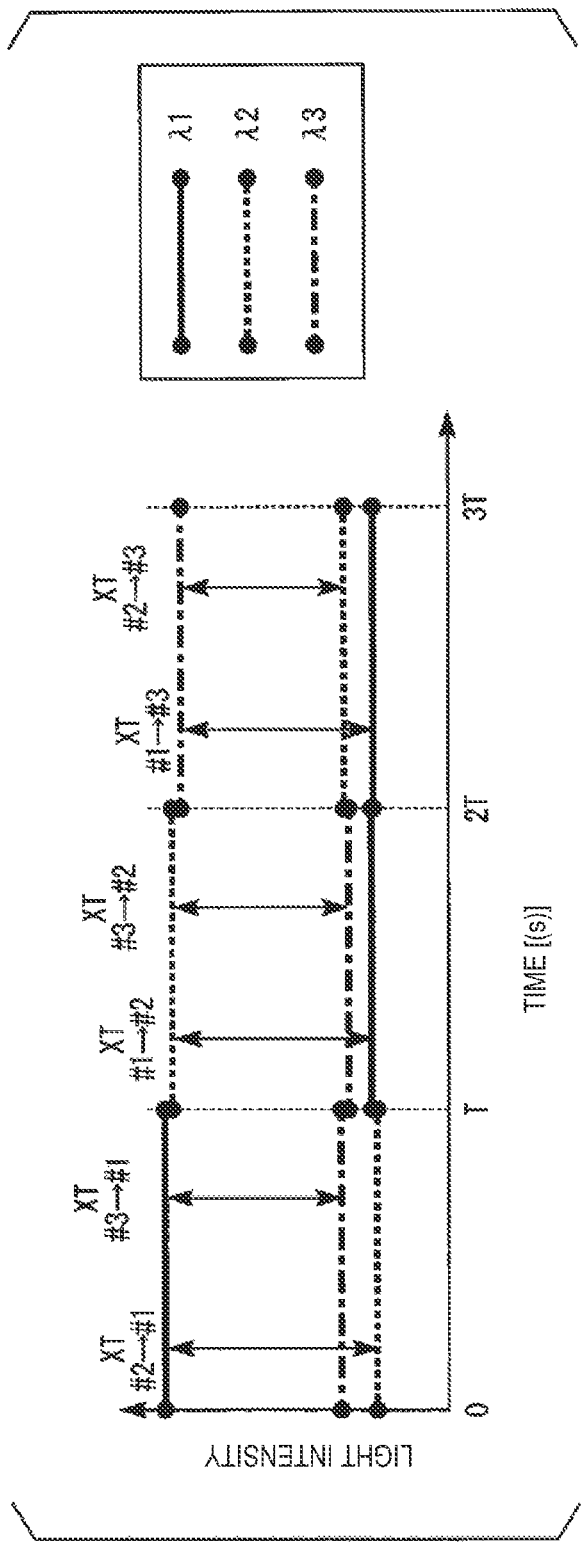
FIG. 7 is a diagram for illustrating an example of a method of estimating a crosstalk according to the second embodiment.

FIG. 7 is a diagram for illustrating an example of a method of estimating a crosstalk. The length of time from the time 0 (inclusive) to the time T (exclusive) is equal to or longer than a half of the duration of one frame of the modulated optical signal (modulated signal).

The signal processing unit 9 estimates the crosstalk in any one of the cores 500 in the multi-core fiber 50 from the plurality of other cores 500 by summing the intensities (crosstalks) of the light leaking from the other cores 500 to the one core 500.

For example, the signal processing unit 9 sums the difference in time average data of the light intensity in the core 500-1 between the polarization-multiplexed light M1 and the polarization-multiplexed light M2 for the period from the time 0 (inclusive) to the time T (exclusive) and the difference in time average data of the light intensity in the core 500-1 between the polarization-multiplexed light M1 and the polarization-multiplexed light M3 for the period from the time 0 (inclusive) to the time T (exclusive). The signal processing unit 9 estimates the crosstalk to the core 500-1 from the other cores 500 for the period from the time 0 (inclusive) to the time T (exclusive) by summing the differences in light intensity in this way. The same process is performed for the period from the time T (inclusive) to the time 2T (exclusive) and the period from the time 2T (inclusive) to the time 3T (exclusive).

As described above, the N×1 SW 71 according to the second embodiment selects one polarization-multiplexed light from the polarization-multiplexed lights output from the optical couplers 70-1 to 70-3 and changes the polarization-multiplexed light to be selected depending on the elapsed time. That is, the N×1 SW 71 selects an optical coupler 70 from the optical couplers 70-1 to 70-3 and changes the optical coupler 70 to be selected depending on the elapsed time. The multi-wavelength light receiver 80 receives the polarization-multiplexed light M1, the polarization-multiplexed light M2 and the polarization-multiplexed light M3 transmitted in the core 500-1 from the N×1 SW 71 in the period from the time 0 (inclusive) to the time T (exclusive). The signal processing unit 9 sums the difference in the time average data of the light intensity between the polarization-multiplexed light M1 and the polarization-multiplexed light M2 in the core 500-1 for the period from the time 0 (inclusive) to the time T (exclusive) and the difference in time average data of the light intensity between the polarization-multiplexed light M1 and the polarization-multiplexed light M3 in the core 500-1 for the period from the time 0 (inclusive) to the time T (exclusive).

Thus, when the optical transmission system using the multi-core fiber is in operation, the crosstalk estimation system 1 according to the second embodiment can estimate the crosstalk between the cores in the multi-core fiber with improved precision with a simple configuration.

Third Embodiment

A third embodiment differs from the second embodiment in configuration of the monitor light source unit 2 and configuration of the monitor light input unit 3. The third embodiment will be described, focusing on the difference from the second embodiment.

Figure 8:
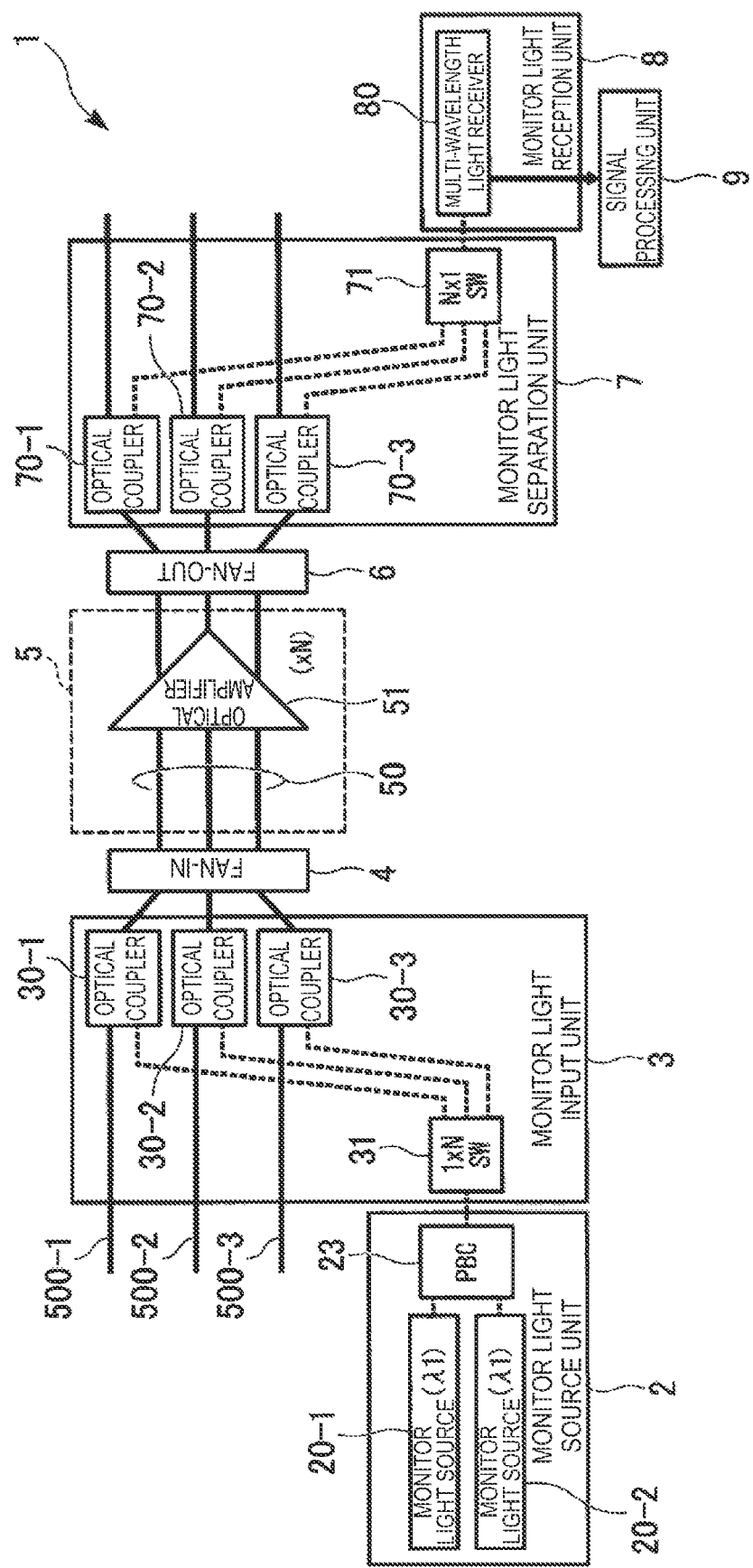
FIG. 8 is a diagram showing an example of a configuration of a crosstalk estimation system according to a third embodiment.

FIG. 8 is a diagram showing an example of the configuration of the crosstalk estimation system 1. The monitor light source unit 2 includes the monitor light sources 20-1 and 20-2 and the PBC 23. The PBC 23 emits the polarization-multiplexed light M1 to the monitor light input unit 3. The monitor light input unit 3 includes a plurality of optical couplers 30 and a 1×N SW 31, and the number of the optical couplers 30 is equal to or greater than 2 and equal to or smaller than the number of the cores.

The 1×N SW 31 is a switch that has one input for polarization-multiplexed light and N outputs for polarization-multiplexed light. The 1×N SW 31 selects an optical coupler 30 from the optical couplers 30-1 to 30-3 and changes the optical coupler 30 to be selected depending on the elapsed time. The 1×N SW 31 selects the optical coupler 30-1 for the period from the time 0 (inclusive) to the time T (exclusive). The 1×N SW 31 selects the optical coupler 30-2 for the period from the time T (inclusive) to the time 2T (exclusive). The 1×N SW 31 selects the optical coupler 30-3 for the period from the time 2T (inclusive) to the time 3T (exclusive). The 1×N SW 31 emits the polarization-multiplexed light M1 to the optical coupler 30 selected for each transmission period having a length of T.

The monitor light separation unit 7 includes a plurality of optical couplers 70 and the N×1 SW 71, and the number of the optical couplers 70 is equal to or greater than 2 and equal to or smaller than the number of the cores. The N×1 SW 71 selects the polarization-multiplexed light to be emitted to the monitor light reception unit 8 from the monitor lights output from the optical couplers 70-1 to 70-3 for each period having a length 3T. That is, the N×1 SW 71 selects the optical coupler 70-1 for a period from the time 0 (inclusive) to the time 3T (exclusive). The N×1 SW 71 selects the optical coupler 70-2 for a period from the time 3T (inclusive) to a time 6T (exclusive). The N×1 SW 71 selects the optical coupler 70-3 for a period from the time 6T (inclusive) to a time 9T (exclusive).

Figure 9:
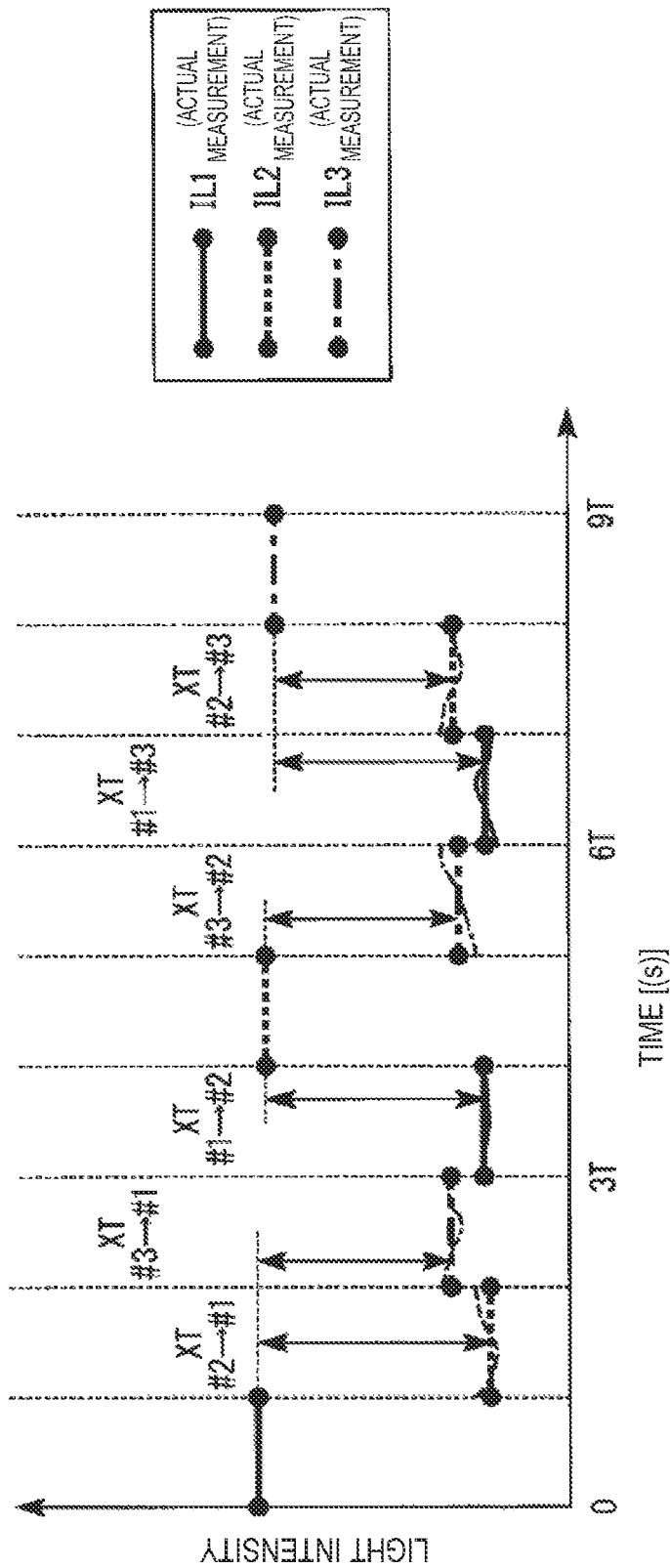
FIG. 9 is a diagram for illustrating an example of a method of estimating a crosstalk according to the third embodiment.

FIG. 9 is a diagram for illustrating an example of a method of estimating a crosstalk. The signal processing unit 9 calculates a sectional average value (IL1 (actual measurement)) in the temporal direction of a light intensity I of the polarization-multiplexed light M1 transmitted in the core 500-1 for the period from the time 0 (inclusive) to the time T (exclusive). The signal processing unit 9 calculates a sectional average value (IL2 (actual measurement)) in the temporal direction of the light intensity I of the polarization-multiplexed light M1 transmitted in the core 500-2 for the period from the time T (inclusive) to the time 2T (exclusive). The signal processing unit 9 calculates a sectional average value (IL3 (actual measurement)) in the temporal direction of the light intensity I of the polarization-multiplexed light M1 transmitted in the core 500-3 for the period from the time 2T (inclusive) to the time 3T (exclusive).

The signal processing unit 9 estimates the crosstalk to the core 500-1 from the core 500-2 by calculating the difference between the sectional average value (IL1 (actual measurement)) in the temporal direction of the light intensity of the polarization-multiplexed light M1 in the core 500-1 and the sectional average value (IL2 (actual measurement)) in the temporal direction of the light intensity of the polarization-multiplexed light M1 in the core 500-2 in the period from the time T (inclusive) to the time 2T (exclusive).

The signal processing unit 9 estimates the crosstalk to the core 500-1 from the core 500-3 by calculating the difference between the sectional average value (IL1 (actual measurement)) in the temporal direction of the light intensity of the polarization-multiplexed light M1 in the core 500-1 and the sectional average value (IL3 (actual measurement)) in the temporal direction of the light intensity of the polarization-multiplexed light M1 in the core 500-3 in the period from the time 2T (inclusive) to the time 3T (exclusive).

At the time 3T, the signal processing unit 9 estimates the crosstalk to the core 500-1 from the cores 500-2 and 500-3 in the period from the time 0 (inclusive) to the time 3T (exclusive) by summing the crosstalk to the core 500-1 from the core 500-2 and the crosstalk to the core 500-1 from the core 500-3.

At the time 3T, the signal processing unit 9 may estimate the crosstalk to the core 500-1 from the cores 500-2 and 500-3 in the period from the time 0 (inclusive) to the time 3T (exclusive) by calculating the ratio (in dB) between the sectional average value (IL1 (actual measurement)) in the temporal direction of the light intensity of the polarization-multiplexed light M1 in the core 500-1 and the sum of the sectional average values in the temporal direction of the light intensity of the polarization-multiplexed light M2 and the polarization-multiplexed light M3 in the core 500-1.

Similarly, in the period from the time 3T (inclusive) to the time 6T (exclusive), the signal processing unit 9 may estimate the crosstalk to the core 500-2 from the cores 500-1 and 500-3 by calculating the ratio between the light intensity of the polarization-multiplexed light M1 in the core 500-2 and the sum. Similarly, in the period from the time 6T (inclusive) to the time 9T (exclusive), the signal processing unit 9 may estimate the crosstalk to the core 500-3 from the cores 500-1 and 500-2 by calculating the ratio between the light intensity of the polarization-multiplexed light M1 in the core 500-3 and the sum.

As described above, the crosstalk estimation system 1 according to the third embodiment includes the monitor light source unit 2 (light source unit), the monitor light input unit 3 (multiplexer), the transmission line 5, the monitor light separation unit 7 (separation unit), the monitor light reception unit 8 (measurement unit), and the signal processing unit 9 (estimation unit). The monitor light source unit 2 generates the polarization-multiplexed light M1 and emits the polarization-multiplexed light M1. The monitor light input unit 3 multiplexes the modulated signal with the polarization-multiplexed light M1 for each core 500 associated with a different transmission period (such as the period from the time 0 (inclusive) to the time T (exclusive), the period from the time T (inclusive) to the time 2T (exclusive) or the period from the time 2T (inclusive) to the time 3T (exclusive)). The transmission line 5 transmits the modulated signal multiplexed with the polarization-multiplexed light M1 through a different core 500 in each transmission period. The monitor light separation unit 7 separates the polarization-multiplexed light M1 from the modulated signal multiplexed with the polarization-multiplexed light M1 for each core 500. The monitor light reception unit 8 generates light intensity data on the polarization-multiplexed light M1 of each transmission period. The signal processing unit 9 estimates the crosstalks between the cores 500 in each estimation period having a length (such as 3T) that is an integer multiple of the transmission period (such as a period having a length of T) based on the differences in light intensity of the polarization-multiplexed light M1 between the transmission periods.

Thus, when the optical transmission system using the multi-core fiber is in operation, the crosstalk estimation system 1 according to the third embodiment can estimate the crosstalk between the cores in the multi-core fiber with improved precision with a simple configuration.

Fourth Embodiment

A fourth embodiment differs from the third embodiment in configuration of the monitor light source unit 2 and configuration of the monitor light input unit 3. The fourth embodiment will be described, focusing on the difference from the third embodiment.

Figure 10:
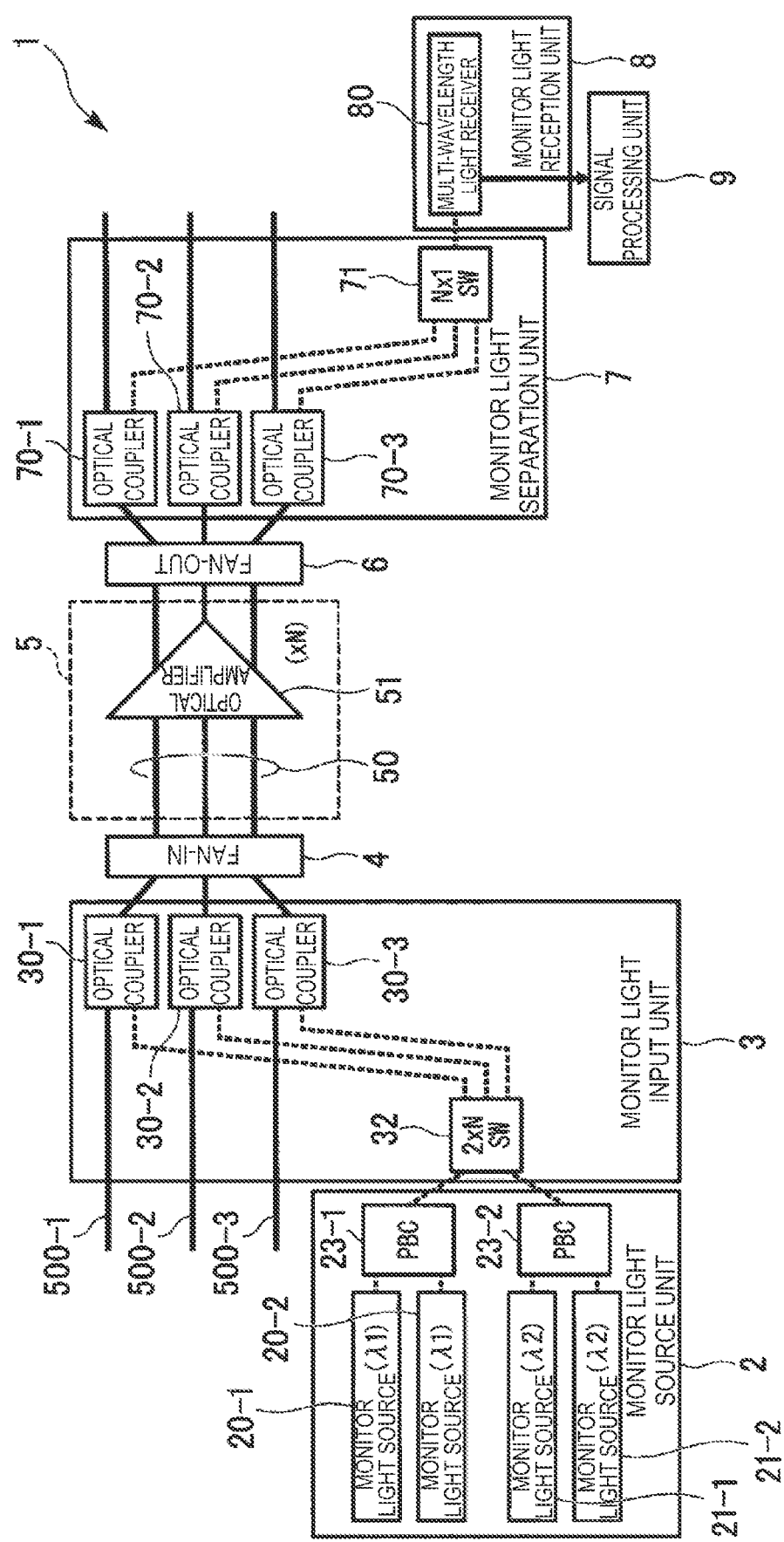
FIG. 10 is a diagram showing an example of a configuration of a crosstalk estimation system according to a fourth embodiment.

FIG. 10 is a diagram showing an example of the configuration of the crosstalk estimation system. The monitor light source unit 2 includes the monitor light sources 20-1 and 20-2, the monitor light sources 21-1 and 21-2 and the PBCs 23-1 to 23-2. The monitor light input unit 3 includes the optical couplers 30-1 and 30-3 and a 2×N SW 32.

The 2×N SW 32 is a switch that has two inputs for polarization-multiplexed light and N outputs for polarization-multiplexed light. The 2×N SW 32 changes the optical coupler 30 to which the polarization-multiplexed light is to be output depending on the elapsed time. The 2×N SW 32 allows polarization-multiplexed lights of different wavelengths to be incident on a core 500 to be measured and another core 500.

The 2×N SW 32 emits the polarization-multiplexed light M1 of the wavelength $\lambda 1$ to the optical coupler 30-1 in the period from the time 0 (inclusive) to the time T (exclusive). The 2×N SW 32 emits the polarization-multiplexed light M2 of the wavelength $\lambda 2$ to the optical couplers 30-2 and 30-3 in the period from the time 0 (inclusive) to the time T (exclusive).

The 2×N SW 32 emits the polarization-multiplexed light of the wavelength $\lambda 1$ to the optical coupler 30-2 in the period from the time T (inclusive) to the time 2T (exclusive). The 2×N SW 32 emits the polarization-multiplexed light M2 of the wavelength $\lambda 2$ to the optical couplers 30-1 and 30-3 in the period from the time T (inclusive) to the time 2T (exclusive).

The 2×N SW 32 emits the polarization-multiplexed light of the wavelength $\lambda 1$ to the optical coupler 30-3 in the period from the time 2T (inclusive) to the time 3T (exclusive). The 2×N SW 32 emits the polarization-multiplexed light M2 of the wavelength $\lambda 2$ to the optical couplers 30-1 and 30-2 in the period from the time T (inclusive) to the time 2T (exclusive).

In the monitor light separation unit 7, the N×1 SW 71 selects a polarization-multiplexed light to be output to the monitor light reception unit 8 from the monitor lights output from the optical couplers 70-1 to 70-3 and changes the polarization-multiplexed light to be selected depending on the elapsed time. That is, the N×1 SW 71 selects an optical coupler 70 from the optical couplers 70-1 to 70-3 and changes the optical coupler 70 to be selected depending on the elapsed time.

In the period from the time 0 (inclusive) to the time T (exclusive), the polarization-multiplexed light M2 of the wavelength $\lambda 2$ may leak from the core 500-2 or 500-3 to the core 500-1. In the period from the time 0 (inclusive) to the time T (exclusive), the N×1 SW 71 selects the optical coupler 70-1 (core 500-1). The signal processing unit 9 estimates the crosstalk between the core 500-1 and the cores 500-2 and 500-3.

In the period from the time T (inclusive) to the time 2T (exclusive), the polarization-multiplexed light M2 of the wavelength $\lambda 2$ may leak from the core 500-1 or 500-3 to the core 500-2. In the period from the time T (inclusive) to the time 2T (exclusive), the N×1 SW 71 selects the optical coupler 70-2 (core 500-2). The signal processing unit 9 estimates the crosstalk between the core 500-2 and the cores 500-1 and 500-3.

In the period from the time 2T (inclusive) to the time 3T (exclusive), the polarization-multiplexed light M2 of the wavelength $\lambda 2$ may leak from the core 500-1 or 500-2 to the core 500-3. In the period from the time 2T (inclusive) to the time 3T (exclusive), the N×1 SW 71 selects the optical coupler 70-3 (core 500-3). The signal processing unit 9 estimates the crosstalk between the core 500-3 and the cores 500-1 and 500-2.

As described above, the 2×N SW 32 allows polarization-multiplexed lights of different wavelengths to be incident on a core 500 to be measured and another core 500. For example, the 2×N SW 32 emits the polarization-multiplexed light M1 of the wavelength $\lambda 1$ to the optical coupler 30-1 in the period from the time 0 (inclusive) to the time T (exclusive). The 2×N SW 32 emits the polarization-multiplexed light M2 of the wavelength $\lambda 2$ to the optical couplers 30-2 and 30-3 in the period from the time 0 (inclusive) to the time T (exclusive). The N×1 SW 71 selects an optical coupler 70 from the optical couplers 70-1 to 70-3 and changes the optical coupler 70 to be selected depending on the elapsed time. For example, the N×1 SW 71 selects the optical coupler 70-1 (core 500-1) in the period from the time 0 (inclusive) to the time T (exclusive).

Thus, when the optical transmission system using the multi-core fiber is in operation, the crosstalk estimation system 1 according to the fourth embodiment can estimate the crosstalk between the cores in the multi-core fiber with improved precision.

Fifth Embodiment

A fifth embodiment differs from the first embodiment in configuration of the monitor light source unit 2. The fifth embodiment will be described, focusing on the difference from the first embodiment.

Figure 11:
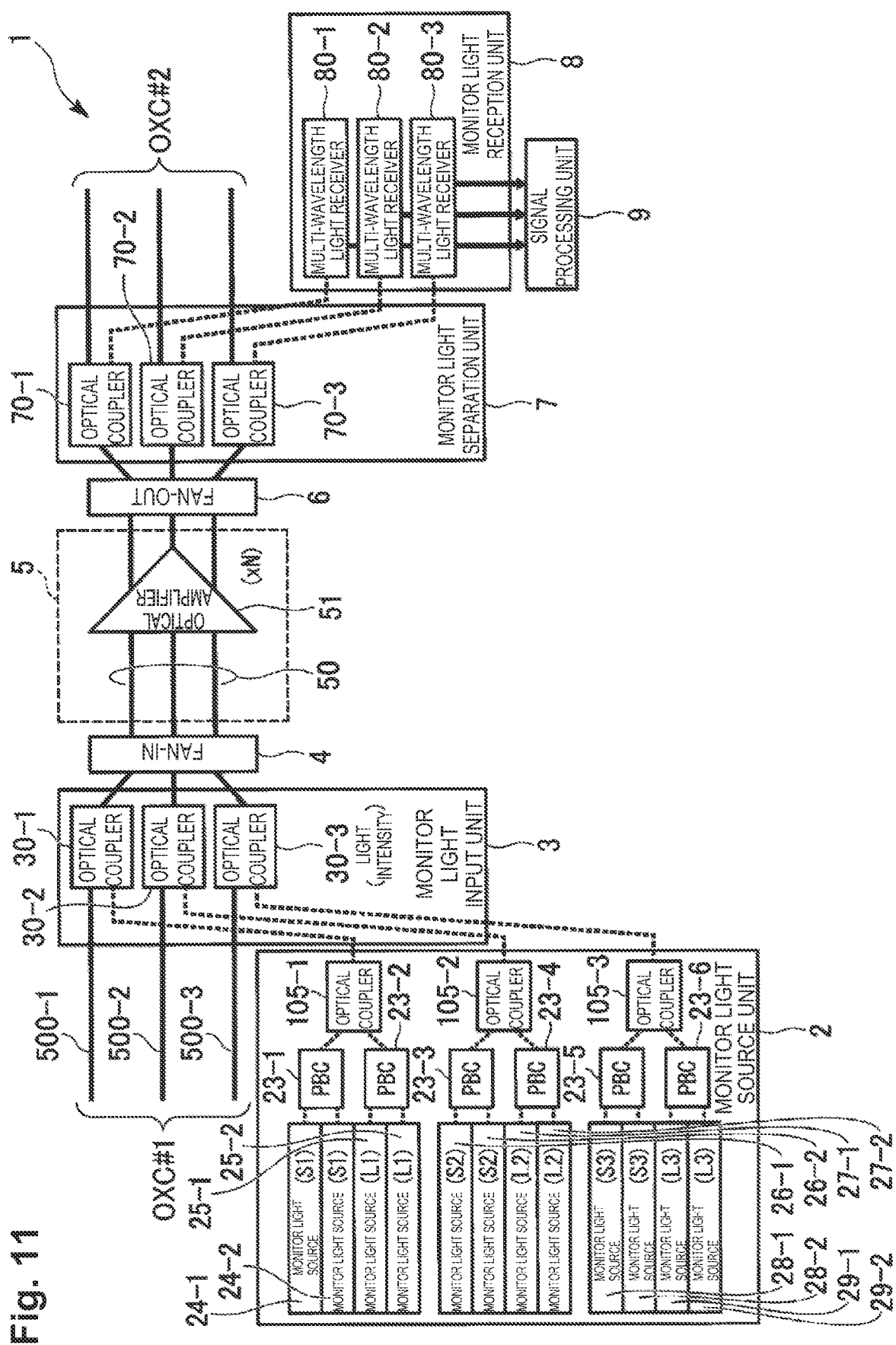
FIG. 11 is a diagram showing an example of a configuration of a crosstalk estimation system according to a fifth embodiment.

FIG. 11 is a diagram showing an example of the configuration of the crosstalk estimation system 1. Polarization-multiplexed lights of two different wavelengths are incident on each core 500. The monitor light source unit 2 includes monitor light sources 24-1 and 24-2, monitor light sources 25-1 and 25-2, monitor light sources 26-1 and 26-2, monitor light sources 27-1 and 27-2, monitor light sources 28-1 and 28-2, and monitor light sources 29-1 and 29-2. The monitor light source unit 2 further includes PBCs 23-1 to 23-6. The monitor light source unit 2 further includes optical couplers 105-1 to 105-3.

The monitor light sources 24-1 and 24-2 emit a polarization-multiplexed light S1 of a wavelength $\lambda 1s$ to the PBC 23-1. The wavelength $\lambda 1s$ is a short wavelength (a short wavelength outside the signal band) that is different from the wavelength of the modulated optical signal in the core 500-1. The monitor light sources 25-1 and 25-2 emit a polarization-multiplexed light L1 of a wavelength $\lambda 11$ to the PBC 23-2. The wavelength $\lambda 11$ is a long wavelength (a long wavelength outside the signal band) that is different from the wavelength of the modulated optical signal in the core 500-1.

The monitor light sources 26-1 and 26-2 emit a polarization-multiplexed light S2 of a wavelength $\lambda 2s$ to the PBC 23-3. The wavelength $\lambda 2s$ is a short wavelength (a short wavelength outside the signal band) that is different from the wavelength of the modulated optical signal in the core 500-2. The monitor light sources 27-1 and 27-2 emit a polarization-multiplexed light L2 of a wavelength $\lambda 21$ to the PBC 23-4. The wavelength $\lambda 21$ is a long wavelength (a long wavelength outside the signal band) that is different from the wavelength of the modulated optical signal in the core 500-2.

The monitor light sources 28-1 and 28-2 emit a polarization-multiplexed light S3 of a wavelength $\lambda 3s$ to the PBC 23-5. The wavelength $\lambda 3s$ is a short wavelength (a short wavelength outside the signal band) that is different from the wavelength of the modulated optical signal in the core 500-3. The monitor light sources 29-1 and 29-2 emit a polarization-multiplexed light L3 of a wavelength $\lambda 31$ to the PBC 23-6. The wavelength $\lambda 31$ is a long wavelength (a long wavelength outside the signal band) that is different from the wavelength of the modulated optical signal in the core 500-3.

The wavelength λ1s of the polarization-multiplexed light S1, the wavelength λ2s of the polarization-multiplexed light S2 and the wavelength λ3s of the polarization-multiplexed light S3 are wavelength in a lower sideband. Of these wavelengths, the wavelength λ1s is the shortest wavelength, and the wavelength λ3s is the longest wavelength. The wavelength λ11 of the polarization-multiplexed light S1, the wavelength λ21 of the polarization-multiplexed light S2 and the wavelength λ31 of the polarization-multiplexed light S3 are wavelength in an upper sideband. Of these wavelengths, the wavelength λ11 is the shortest wavelength, and the wavelength λ31 is the longest wavelength.

The PBC 23-1 receives the polarized light (of the wavelength λ1s) emitted from the monitor light source 24-1 and the polarized light (of the wavelength λ1s) emitted from the monitor light source 24-2 in the form of a polarization-multiplexed light S1 (of the wavelength λ1s) while maintaining the polarization of each polarized light. The PBC 23-1 emits the polarization-multiplexed light S1 to the optical coupler 105-1.

The PBC 23-2 receives the polarized light (of the wavelength λ11) emitted from the monitor light source 25-1 and the polarized light (of the wavelength λ11) emitted from the monitor light source 26-2 in the form of a polarization-multiplexed light L1 (of the wavelength λ11) while maintaining the polarization of each polarized light. The PBC 23-2 emits the polarization-multiplexed light L1 to the optical coupler 105-1.

The PBC 23-3 receives the polarized light (of the wavelength λ2s) emitted from the monitor light source 26-1 and the polarized light (of the wavelength λ2s) emitted from the monitor light source 26-2 in the form of a polarization-multiplexed light S2 (of the wavelength λ2s) while maintaining the polarization of each polarized light. The PBC 23-3 emits the polarization-multiplexed light S2 to the optical coupler 105-2.

The PBC 23-4 receives the polarized light (of the wavelength λ21) emitted from the monitor light source 27-1 and the polarized light (of the wavelength λ21) emitted from the monitor light source 27-2 in the form of a polarization-multiplexed light L2 (of the wavelength λ21) while maintaining the polarization of each polarized light. The PBC 23-4 emits the polarization-multiplexed light L2 to the optical coupler 105-2.

The PBC 23-5 receives the polarized light (of the wavelength λ3s) emitted from the monitor light source 28-1 and the polarized light (of the wavelength λ3s) emitted from the monitor light source 28-2 in the form of a polarization-multiplexed light S3 (of the wavelength λ2s) while maintaining the polarization of each polarized light. The PBC 23-5 emits the polarization-multiplexed light S3 to the optical coupler 105-3.

The PBC 23-6 receives the polarized light (of the wavelength λ31) emitted from the monitor light source 29-1 and the polarized light (of the wavelength λ31) emitted from the monitor light source 29-2 in the form of a polarization-multiplexed light L3 (of the wavelength λ21) while maintaining the polarization of each polarized light. The PBC 23-6 emits the polarization-multiplexed light L3 to the optical coupler 105-3.

The optical coupler 105-1 multiplexes the polarization-multiplexed light S1 and the polarization-multiplexed light L1. The optical coupler 105-1 emits the multiplexed polarization-multiplexed light S1 and polarization-multiplexed light L1 to the optical coupler 30-1. The optical coupler 105-2 multiplexes the polarization-multiplexed light S2 and the polarization-multiplexed light L2. The optical coupler 105-2 emits the multiplexed polarization-multiplexed light S2 and polarization-multiplexed light L2 to the optical coupler 30-2. The optical coupler 105-3 multiplexes the polarization-multiplexed light S3 and the polarization-multiplexed light L3. The optical coupler 105-3 emits the multiplexed polarization-multiplexed light S3 and polarization-multiplexed light L3 to the optical coupler 30-3.

The monitor light input unit 3 is connected to a first optical cross connect (OXC) (OXC #1) through the cores 500-1 to 500-3. The first optical cross connect emits a modulated optical signal to the monitor light input unit 3 through the cores 500-1 to 500-3.

The optical coupler 30-1 multiplexes the modulated signal to be incident on the fan-in 4 through the core 500-1 with the polarization-multiplexed light S1 and polarization-multiplexed light L1 emitted from the PBC 23-1. The optical coupler 30-2 multiplexes the modulated signal to be incident on the fan-in 4 through the core 500-2 with the polarization-multiplexed light S2 and polarization-multiplexed light L2 emitted by the PBC 23-2. The optical coupler 30-3 multiplexes the modulated signal to be incident on the fan-in 4 through the core 500-3 with the polarization-multiplexed light S3 and polarization-multiplexed light L3 emitted from the PBC 23-3.

Some of the modulated signal multiplexed with the polarization-multiplexed lights leaks from a core 500 to another core 500 in the transmission line 5. Therefore, when each modulated signal multiplexed with polarization-multiplexed lights in each core 500 reaches the monitor light separation unit 7, the modulated signal contains the polarization-multiplexed light S1 and the polarization-multiplexed light L1, the polarization-multiplexed light S2 and the polarization-multiplexed light L2, and the polarization-multiplexed light S3 and the polarization-multiplexed light L3.

The monitor light separation unit 7 emits the modulated optical signal to a second optical cross connect (OXC #2) through the cores 500-1 to 500-3. The monitor light separation unit 7 emits the polarization-multiplexed lights separated from the modulated optical signal to the monitor light reception unit 8.

In the monitor light reception unit 8, the multi-wavelength light receiver 80-1 receives the polarization-multiplexed light S1 and the polarization-multiplexed light L1, the polarization-multiplexed light S2 and the polarization-multiplexed light L2 and the polarization-multiplexed light S3 and the polarization-multiplexed light L3 transmitted in the core 500-1. The multi-wavelength light receiver 80-2 receives the polarization-multiplexed light S1 and the polarization-multiplexed light L1, the polarization-multiplexed light S2 and the polarization-multiplexed light L2 and the polarization-multiplexed light S3 and the polarization-multiplexed light L3 transmitted in the core 500-2. The multi-wavelength light receiver 80-3 receives the polarization-multiplexed light S1 and the polarization-multiplexed light L1, the polarization-multiplexed light S2 and the polarization-multiplexed light L2 and the polarization-multiplexed light S3 and the polarization-multiplexed light L3 transmitted in the core 500-3.

The multi-wavelength light receiver 80-1 measures the light intensity of each of the polarization-multiplexed light S1 and the polarization-multiplexed light L1, the polarization-multiplexed light S2 and the polarization-multiplexed light L2 and the polarization-multiplexed light S3 and the polarization-multiplexed light L3 transmitted in the core 500-1. The multi-wavelength light receiver 80-1 outputs, to the signal processing unit 9, the measurements of the light intensity of the polarization-multiplexed light S1 and the polarization-multiplexed light L1, the polarization-multiplexed light S2 and the polarization-multiplexed light L2 and the polarization-multiplexed light S3 and the polarization-multiplexed light L3 transmitted in the core 500-1.

The multi-wavelength light receiver 80-2 measures the light intensity of each of the polarization-multiplexed light S1 and the polarization-multiplexed light L1, the polarization-multiplexed light S2 and the polarization-multiplexed light L2 and the polarization-multiplexed light S3 and the polarization-multiplexed light L3 transmitted in the core 500-2. The multi-wavelength light receiver 80-2 outputs, to the signal processing unit 9, the measurements of the light intensity of the polarization-multiplexed light S1 and the polarization-multiplexed light L1, the polarization-multiplexed light S2 and the polarization-multiplexed light L2 and the polarization-multiplexed light S3 and the polarization-multiplexed light L3 transmitted in the core 500-2.

The multi-wavelength light receiver 80-3 measures the light intensity of each of the polarization-multiplexed light S1 and the polarization-multiplexed light L1, the polarization-multiplexed light S2 and the polarization-multiplexed light L2 and the polarization-multiplexed light S3 and the polarization-multiplexed light L3 transmitted in the core 500-3. The multi-wavelength light receiver 80-3 outputs, to the signal processing unit 9, the measurements of the light intensity of the polarization-multiplexed light S1 and the polarization-multiplexed light L1, the polarization-multiplexed light S2 and the polarization-multiplexed light L2 and the polarization-multiplexed light S3 and the polarization-multiplexed light L3 transmitted in the core 500-3.

Figure 12:
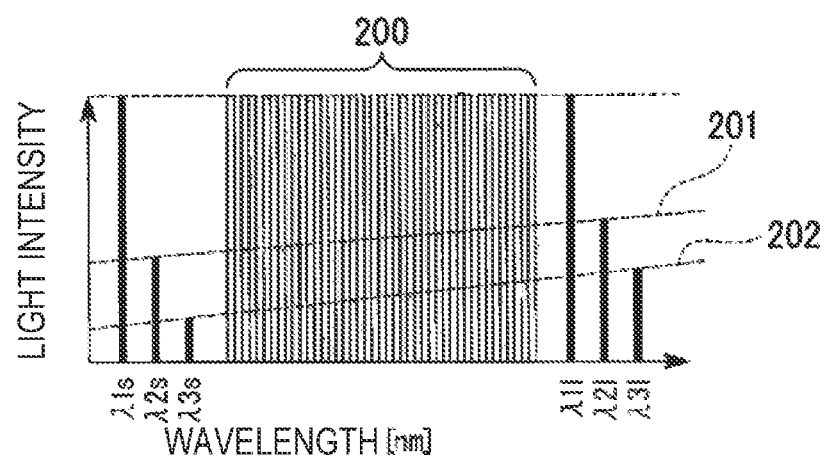
FIG. 12 is a diagram showing an example of a relationship between the wavelength and the light intensity of a polarization-multiplexed light and a modulated signal according to the fifth embodiment.

FIG. 12 is a diagram showing a relationship between the wavelength and the light intensity of the polarization-multiplexed light and the modulated signal. The horizontal axis indicates the wavelength, and the vertical axis indicates the light intensity (optical power). As an example, FIG. 12 shows the result of measurement by the multi-wavelength light receiver 80-1. In the example shown in FIG. 12, the light intensity of the polarization-multiplexed light S2 of the wavelength $\lambda 2s$ is lower than the light intensity of the polarization-multiplexed light L2 of the wavelength $\lambda 2l$. In the example shown in FIG. 12, the light intensity of the polarization-multiplexed light S3 of the wavelength $\lambda 3s$ is lower than the light intensity of the polarization-multiplexed light L3 of the wavelength $\lambda 2l$.

In FIG. 12, the signal processing unit 9 calculates an auxiliary line 201 connecting the apex of the bar indicating the light intensity of the polarization-multiplexed light S2 and the apex of the bar indicating the light intensity of the polarization-multiplexed light L2. In FIG. 12, the auxiliary line 201 traverses the frequency distribution graph of a signal band 200. Therefore, the signal processing unit 9 can estimate the light intensity of the polarization-multiplexed lights S2 or the polarization-multiplexed light L2 in the signal band 200 based on the auxiliary line 201.

Similarly, the signal processing unit 9 calculates an auxiliary line 202 connecting the apex of the bar indicating the light intensity of the polarization-multiplexed light S3 and the apex of the bar indicating the light intensity of the polarization-multiplexed light L3. In FIG. 12, the auxiliary line 202 traverses the frequency distribution graph of the signal band 200. Therefore, the signal processing unit 9 can estimate the light intensity of the polarization-multiplexed lights S3 or the polarization-multiplexed light L3 in the signal band 200 based on the auxiliary line 202.

Figure 20:
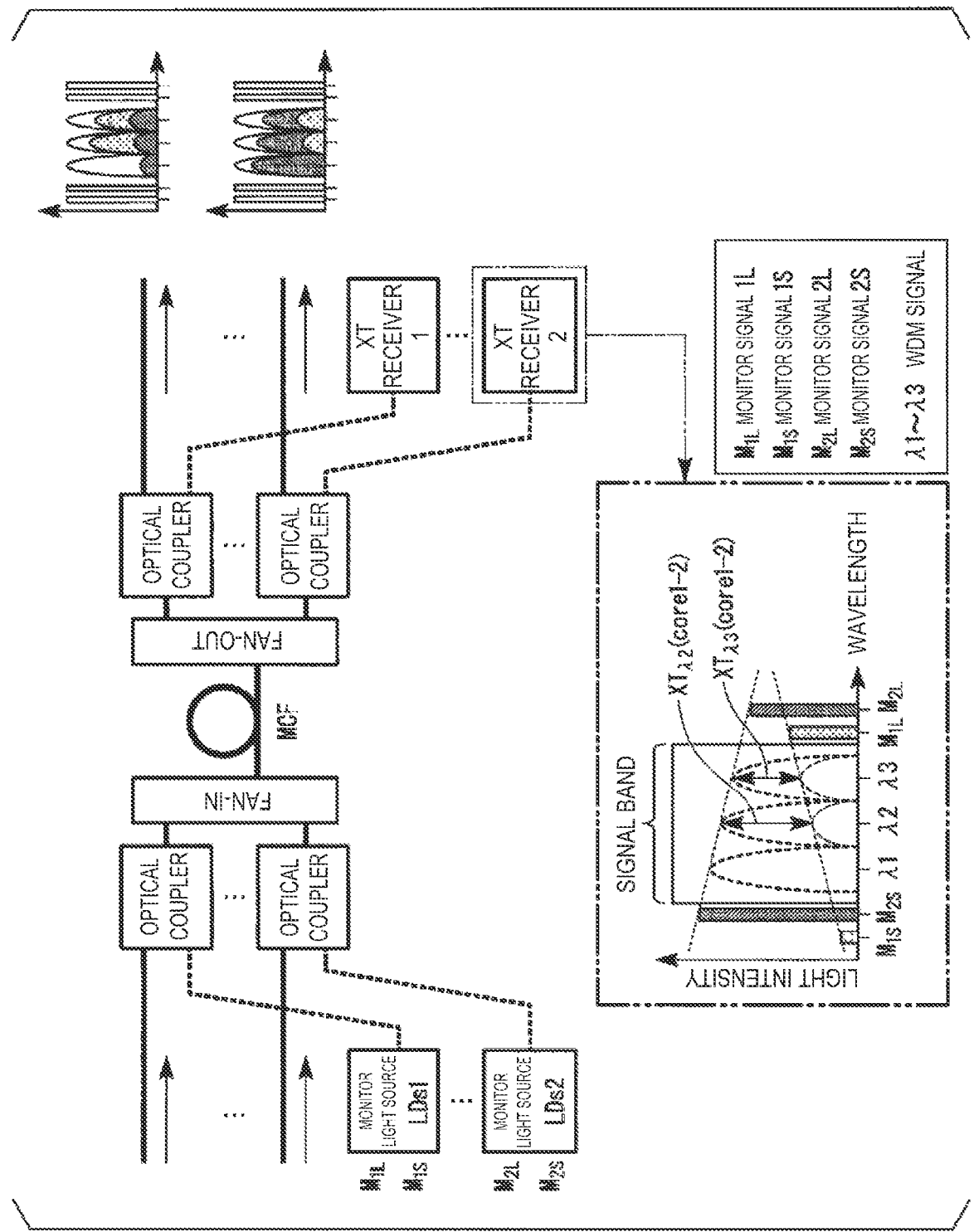
FIG. 20 is a diagram for illustrating an example of a method of monitoring an inter-core crosstalk when an optical transmission system using a multi-core fiber is in operation according to prior art.
Figure 21:
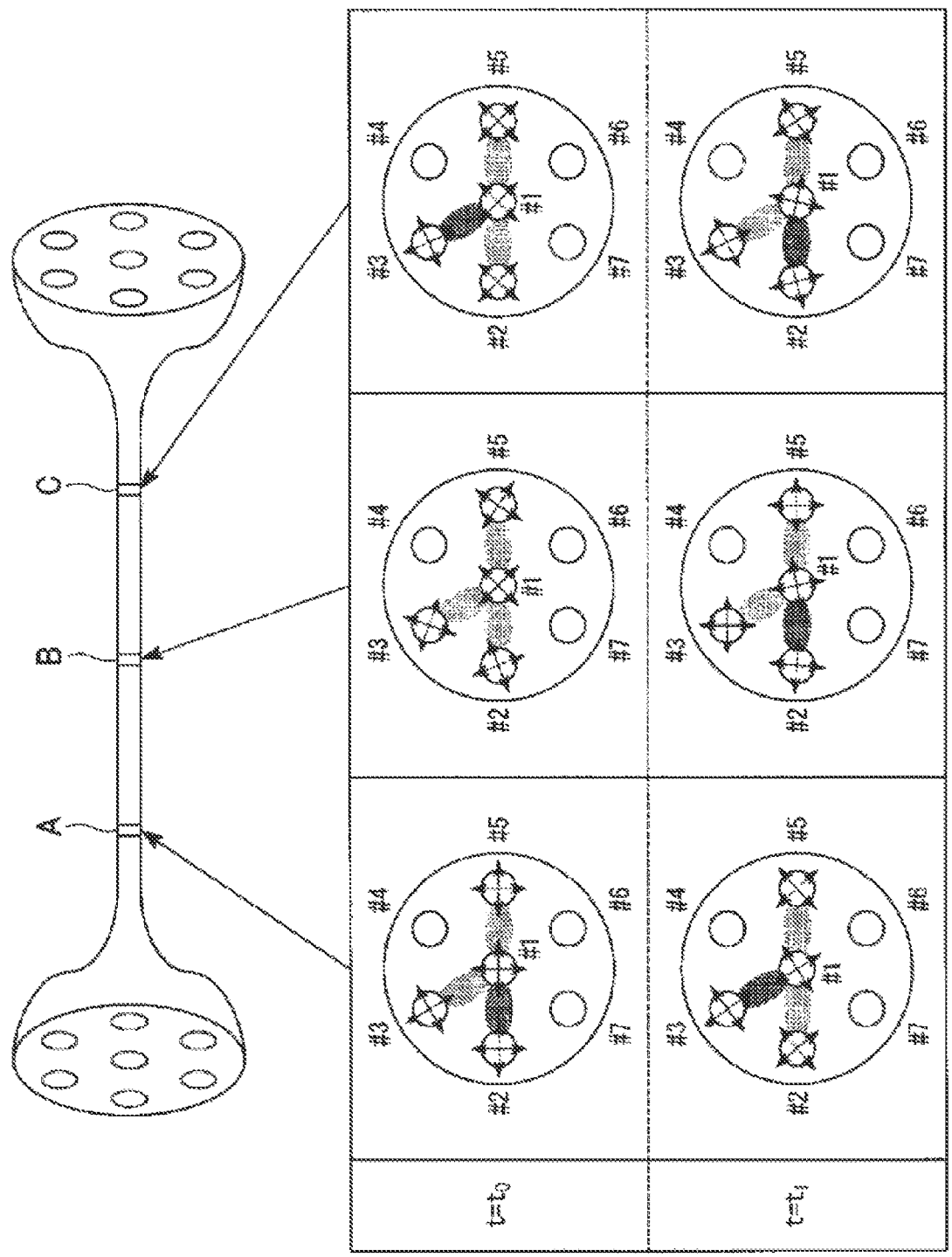
FIG. 21 is a diagram showing an example of a variation of a polarization of an optical signal at points A, B and C in a transmission line using a 7-core multi-core fiber (MCF) according to prior art.

By performing the processings shown in the graph of FIG. 20, the signal processing unit 9 estimates the crosstalk between two cores 500 in the multi-core fiber 50 based on the difference in light intensity of the polarization-multiplexed light between the cores 500. The signal processing unit 9 may estimate the crosstalk between two cores 500 in the multi-core fiber 50 based on the ratio (in dB) of the light intensity of the polarization-multiplexed light between the cores 500.

As described above, the monitor light source unit 2 generates both a polarization-multiplexed light of a wavelength (such as the wavelength $\lambda 2l$) in the upper sideband of the modulated signal and a polarization-multiplexed light of a wavelength (such as the wavelength $\lambda 2s$) in the lower sideband of the modulated signal.

Thus, when the optical transmission system using the multi-core fiber is in operation, the crosstalk estimation system 1 according to the fifth embodiment can estimate the crosstalk between the cores in the multi-core fiber with improved precision.

Sixth Embodiment

A sixth embodiment differs from the third embodiment in configuration of the monitor light source unit 2. The sixth embodiment will be described, focusing on the difference from the third embodiment.

Figure 13:
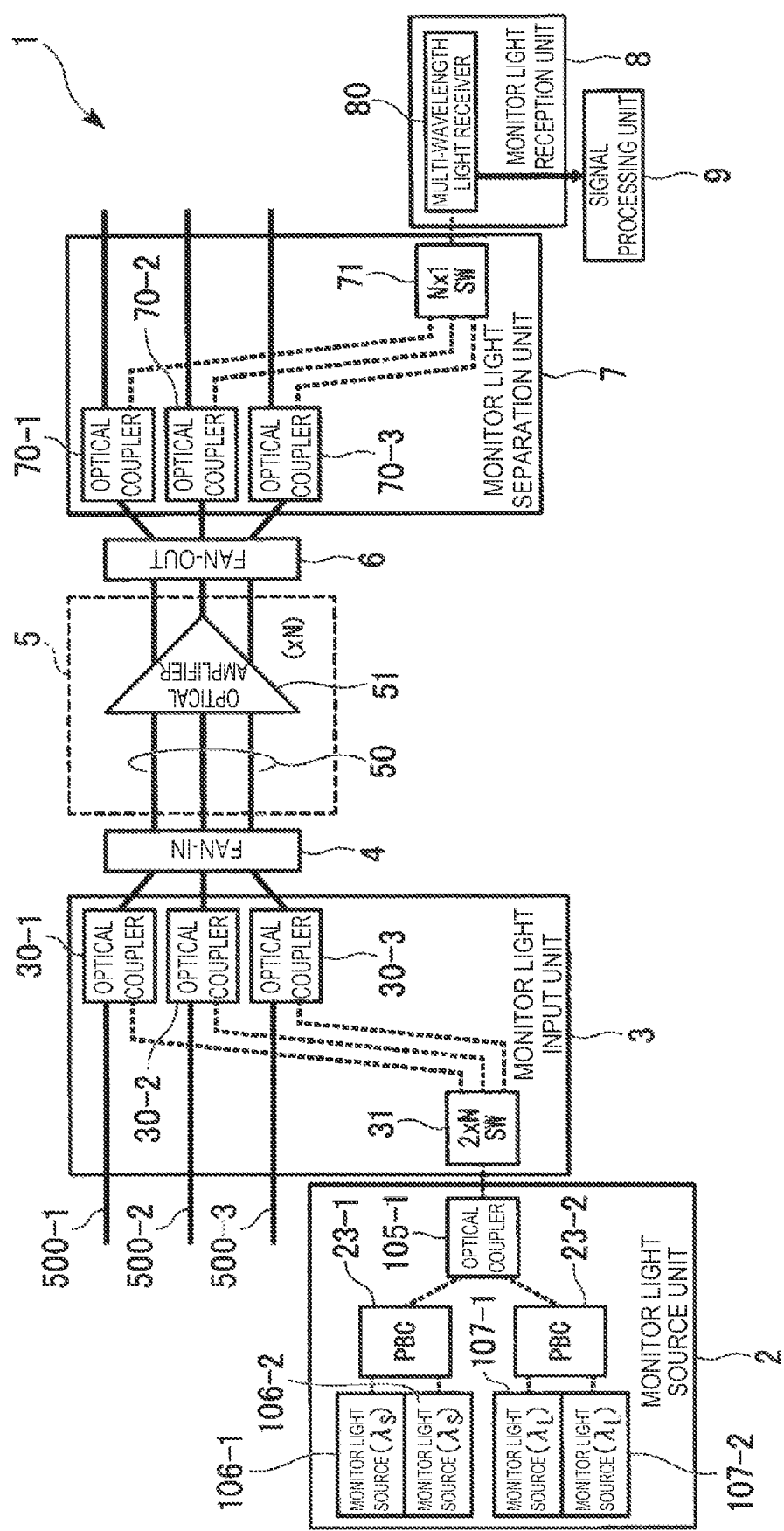
FIG. 13 is a diagram showing an example of a configuration of a crosstalk estimation system according to a sixth embodiment.

FIG. 13 is a diagram showing an example of the configuration of the crosstalk estimation system 1. The monitor light source unit 2 includes the optical coupler 105, monitor light sources 106-1 and 106-2, monitor light sources 107-1 and 107-2, and the PBCs 23-1 and 23-2. The monitor light sources 106 and the monitor light sources 107 are light sources of a single-polarized continuous wave.

Each monitor light source 106 emits a polarized light of a short wavelength $\lambda_S$ to the PBC 23-1 as a monitor light. Thus, the two monitor light sources 106 emit a polarization-multiplexed light of the short wavelength $\lambda_S$ to the PBC 23-1. The wavelength $\lambda_S$ is a wavelength different from the wavelength of the modulated optical signal in the core 500 (that is, a wavelength in the sideband of the signal band).

Each monitor light source 107 emits a polarized light of a wavelength $\lambda_L$ longer than the wavelength $\lambda_S$ to the PBC 23-1 as a monitor light. Thus, the two monitor light sources 107 emit a polarization-multiplexed light to the PBC 23-2. The wavelength XL is a wavelength different from the wavelength of the modulated optical signal in the core 500 (that is, a wavelength in the sideband of the signal band).

The PBC 23-1 receives the polarized light (of the wavelength $\lambda_S$) emitted from the monitor light source 106-1 and the polarized light (of the wavelength $\lambda_S$) emitted from the monitor light source 106-2 in the form of a polarization-multiplexed light (of the wavelength $\lambda_S$) while maintaining the polarization of each polarized light. The PBC 23-1 emits the polarization-multiplexed light (of the wavelength $\lambda_S$) to the optical coupler 105.

The PBC 23-2 receives the polarized light (of the wavelength $\lambda_L$) emitted from the monitor light source 107-1 and the polarized light (of the wavelength XL) emitted from the monitor light source 106-2 in the form of a polarization-multiplexed light (of the wavelength XL) while maintaining the polarization of each polarized light. The PBC 23-2 emits the polarization-multiplexed light (of the wavelength XL) to the optical coupler 105.

The optical coupler 105 multiplexes the polarization-multiplexed light (of the wavelength $\lambda_S$) and the polarization-multiplexed light (of the wavelength XL). The optical coupler 105 emits the multiplexed polarization-multiplexed light (of the wavelength $\lambda_S$) and polarization-multiplexed light (of the wavelength $\lambda_L$) to the 1×N SW 31.

As described above, the monitor light source unit 2 according to the sixth embodiment generates a polarization-multiplexed light for each wavelength in the sideband of the modulated signal. The signal processing unit 9 estimates the crosstalk between the cores 500 in each estimation period (such as a period having a length of 3T), based on the difference in light intensity of the polarization-multiplexed light between the transmission periods (such as periods having a length of T) and the difference in light intensity of the polarization-multiplexed lights of the wavelengths.

Thus, when the optical transmission system using the multi-core fiber is in operation, the crosstalk estimation system 1 according to the sixth embodiment can estimate the crosstalk between the cores in the multi-core fiber with improved precision.

Seventh Embodiment

A seventh embodiment differs from the fourth and sixth embodiments in configuration of the monitor light source unit 2. The seventh embodiment will be described, focusing on the difference from the fourth and sixth embodiment.

Figure 14:
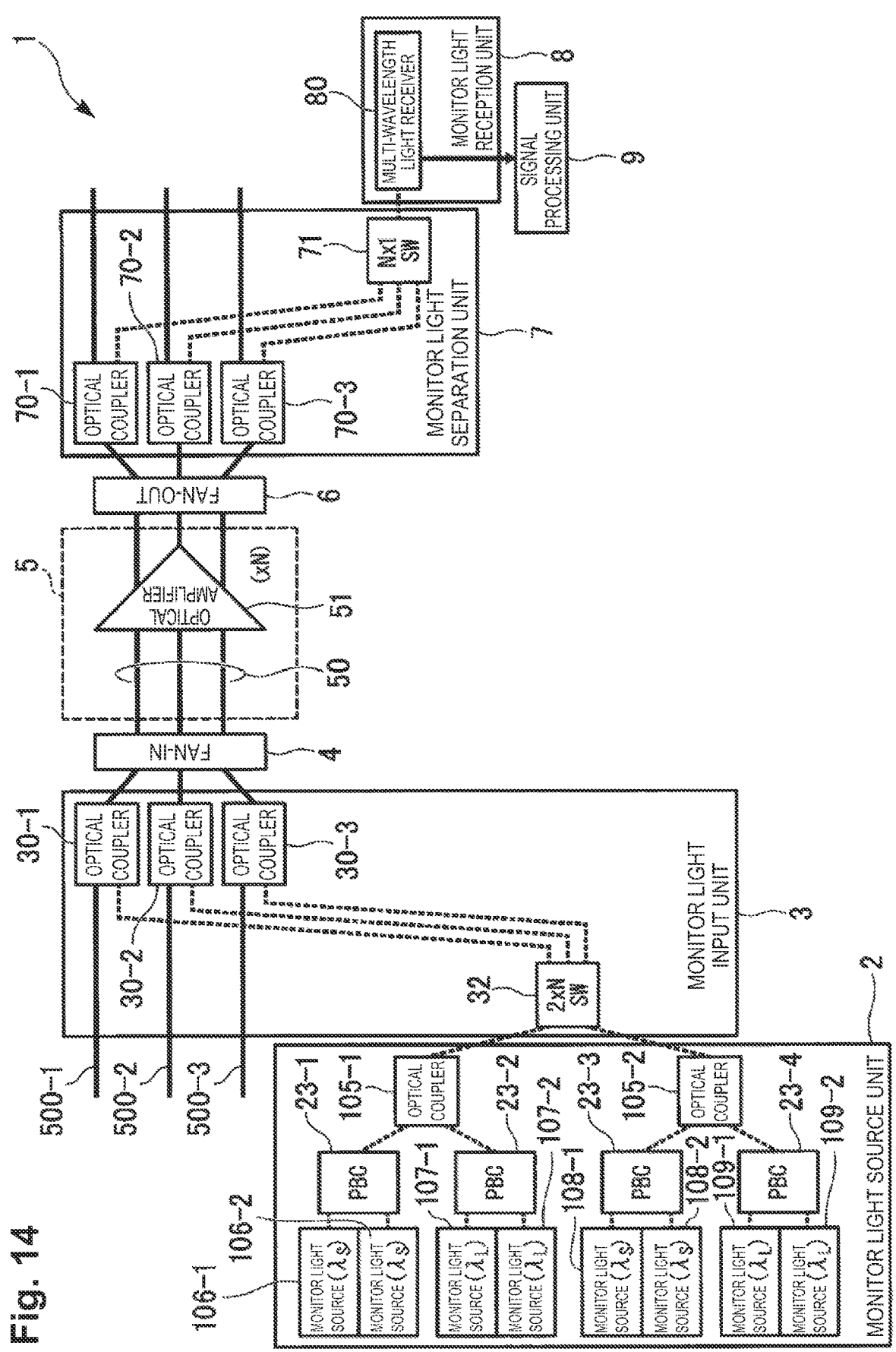
FIG. 14 is a diagram showing an example of a configuration of a crosstalk estimation system according to a seventh embodiment.
Figure 15:
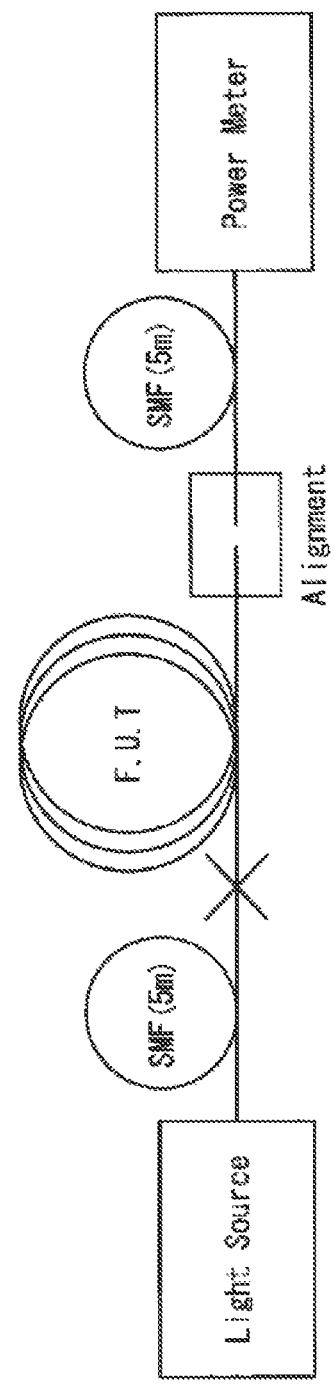
FIG. 15 is a diagram for illustrating a method of simply measuring an inter-core crosstalk using an evaluation system according to prior art.
Figure 16:
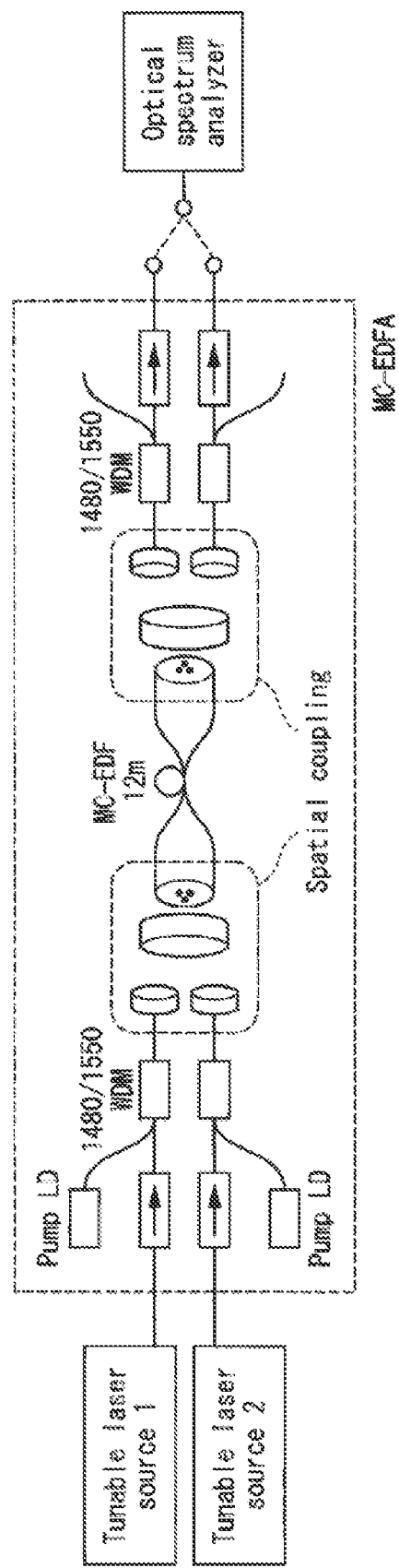
FIG. 16 is a diagram showing an example of a configuration of a system for measuring an inter-core crosstalk of a multi-core optical amplifier according to prior art.
Figure 17:
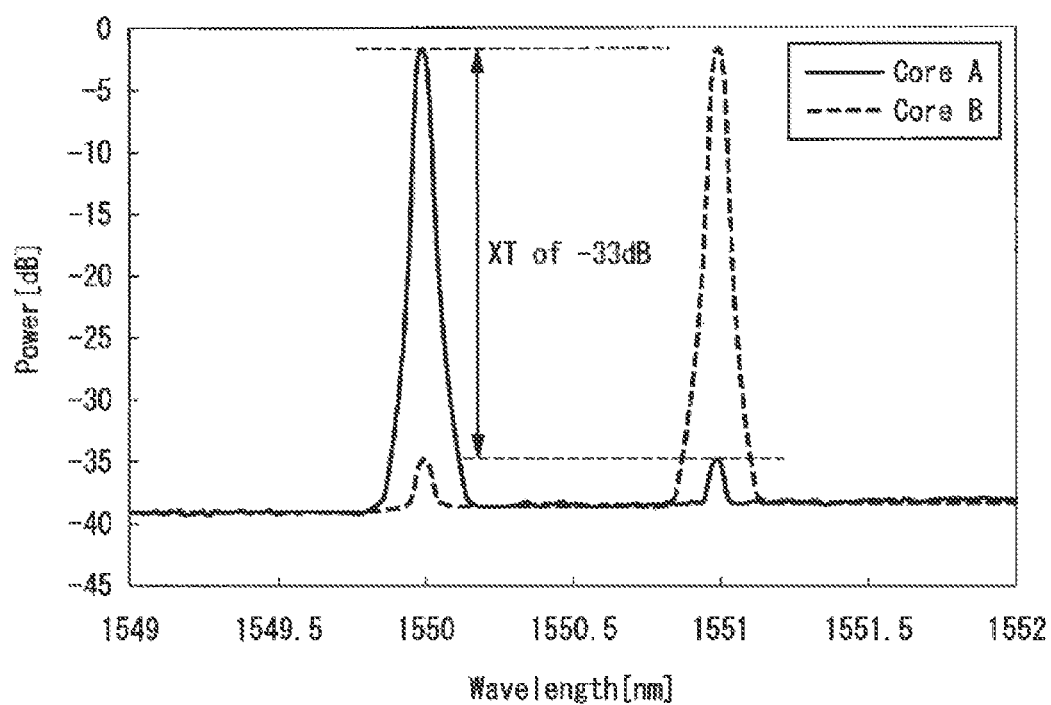
FIG. 17 is a graph showing an example of an amplifier output spectrum, which shows an evaluation of an inter-core crosstalk measured by an optical spectrum analyzer, according to prior art.
Figure 18:
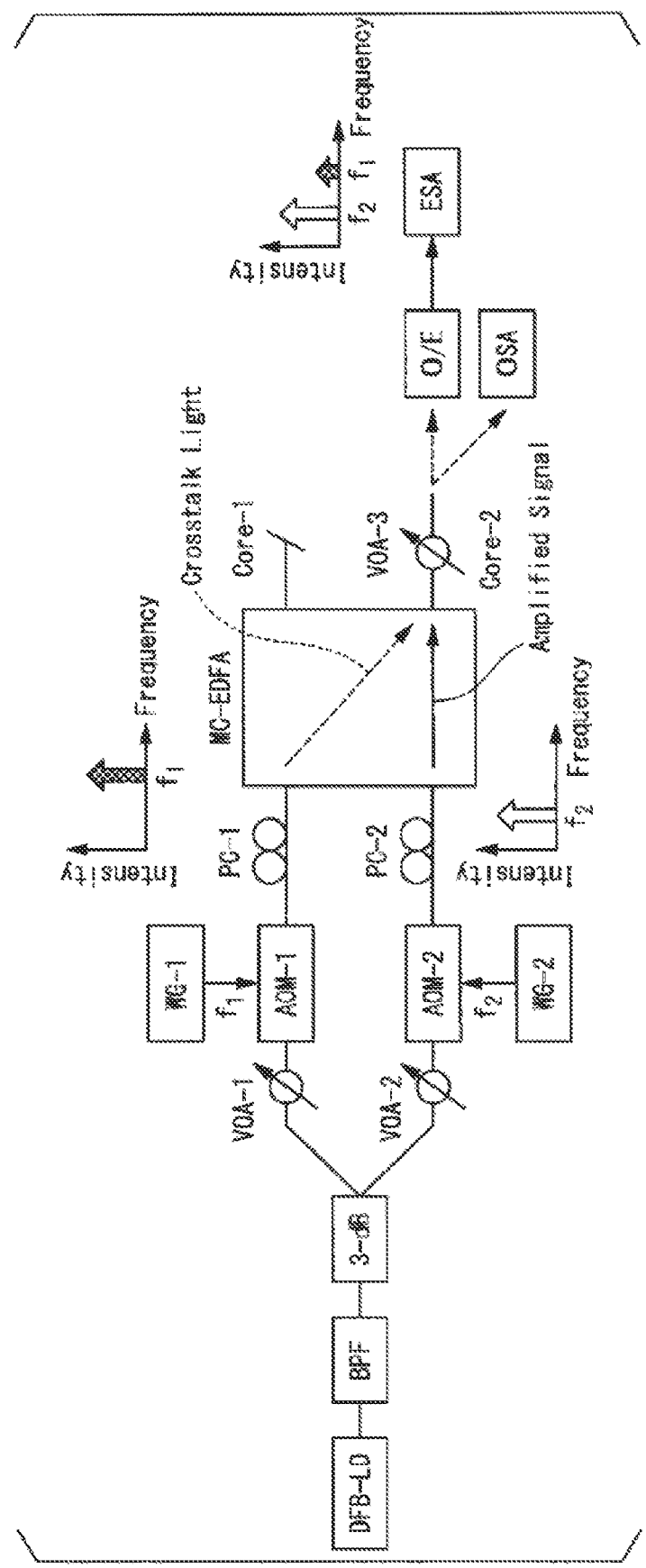
FIG. 18 is a diagram for illustrating an example of a method of measuring an inter-core crosstalk using an intensity tone according to prior art.
Figure 19:
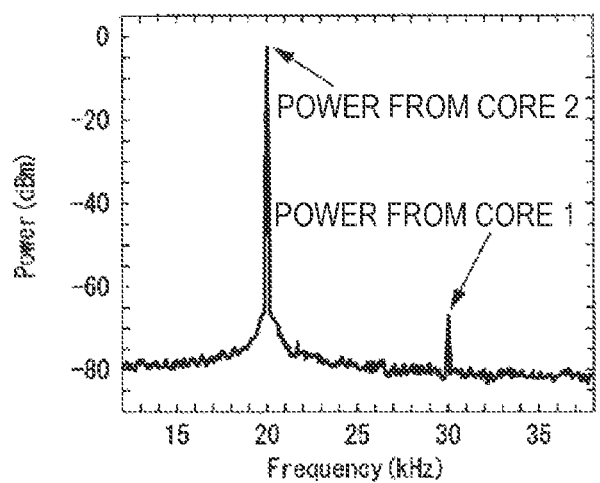
FIG. 19 is a graph showing an example of the difference in level between tone frequency components derived from an electrical spectrum according to prior art.

FIG. 14 is a diagram showing an example of the configuration of the crosstalk estimation system 1. The monitor light source unit 2 includes the optical couplers 105-1 and 105-2, the monitor light sources 106-1 and 106-2, the monitor light sources 107-1 and 107-2, monitor light sources 108-1 and 108-2, monitor light sources 109-1 and 109-2 and the PBCs 23-1 to 23-4. The monitor light sources 106, the monitor light sources 107, the monitor light sources 108 and the monitor light sources 109 are light sources of a single-polarized continuous wave.

Each monitor light source 108 operates in the same manner as each monitor light source 106. Each monitor light source 109 operates in the same manner as each monitor light source 107. The PBC 23-3 is connected to each monitor light source 108. The PBC 23-3 operates in the same manner as the PBC 23-1. The PBC 23-4 is connected to each monitor light source 109. The PBC 23-4 operates in the same manner as the PBC 23-2.

The optical coupler 105-1 multiplexes the polarization-multiplexed light (of the wavelength $\lambda_S$) emitted from the PBC 23-1 and the polarization-multiplexed light (of the wavelength $\lambda_L$) emitted from the PBC 23-2. The optical coupler 105-1 emits the multiplexed polarization-multiplexed light (of the wavelength $\lambda_S$) and polarization-multiplexed light (of the wavelength $\lambda_L$) to the 2×N SW 32.

The optical coupler 105-2 multiplexes the polarization-multiplexed light (of the wavelength $\lambda_S$) emitted from the PBC 23-3 and the polarization-multiplexed light (of the wavelength $\lambda_L$) emitted from the PBC 23-4. The optical coupler 105-1 emits the multiplexed polarization-multiplexed light (of the wavelength $\lambda_S$) and polarization-multiplexed light (of the wavelength $\lambda_L$) to the 2×N SW 32.

The 2×N SW 32 is a switch that has two inputs for polarization-multiplexed light and N outputs for polarization-multiplexed light. The 2×N SW 32 selects an optical coupler 30 from the optical couplers 30-1 to 30-3 and changes the optical coupler 30 to be selected depending on the elapsed time. The 2×N SW 32 selects the optical coupler 30-1 in the period from the time 0 (inclusive) to the time T (exclusive). The 2×N SW 32 selects the optical coupler 30-2 in the period from the time T (inclusive) to the time 2T (exclusive). The 2×N SW 32 selects the optical coupler 30-3 in the period from the time 2T (inclusive) to the time 3T (exclusive).

The 2×N SW 32 emits the polarization-multiplexed light (of the wavelength $\lambda_S$) and polarization-multiplexed light (of the wavelength $\lambda_L$) multiplexed by the optical coupler 105-1 and the polarization-multiplexed light (of the wavelength $\lambda_S$) and polarization-multiplexed light (of the wavelength $\lambda_L$) multiplexed by the optical coupler 105-2 to the optical coupler 30 that is selected in each transmission period having a length of T.

In the monitor light separation unit 7, the N×1 SW 71 selects a polarization-multiplexed light to be output to the monitor light reception unit 8 from the monitor lights output from the optical couplers 70-1 to 70-3 and changes the polarization-multiplexed light to be selected depending on the elapsed time. That is, the N×1 SW 71 selects an optical coupler 70 from the optical couplers 70-1 to 70-3 and changes the optical coupler 70 to be selected depending on the elapsed time.

The N×1 SW 71 selects the optical coupler 70-1 (core 500-1) in the period from the time 0 (inclusive) to the time T (exclusive). The N×1 SW 71 selects the optical coupler 70-2 (core 500-2) in the period from the time T (inclusive) to the time 2T (exclusive). The N×1 SW 71 selects the optical coupler 70-3 (core 500-3) in the period from the time 2T (inclusive) to the time 3T (exclusive).

As described above, the crosstalk estimation system 1 according to the seventh embodiment generates a polarization-multiplexed light for each wavelength in the sideband of the modulated signal in the monitor light source unit 2. The signal processing unit 9 estimates the crosstalk between the cores 500 in each transmission period based on the difference in light intensity between the polarization-multiplexed lights in the transmission periods (such as periods having a length of T) and the difference in light intensity between the polarization-multiplexed lights of the wavelengths.

Thus, when the optical transmission system using the multi-core fiber is in operation, the crosstalk estimation system 1 according to the seventh embodiment can estimate the crosstalk between the cores in the multi-core fiber with improved precision.

Although embodiments of the present invention have been described in detail with reference to the drawings, the present invention is not limited to the specific configurations according to the embodiments and includes other designs or the like that do not depart from the spirit of the present invention.

The crosstalk estimation system or the signal processing unit in the embodiments described above may be implemented by a computer. In that case, the crosstalk estimation system or the signal processing unit may be implemented by recording a program for implementing the functionality thereof in a computer-readable recording medium and by a computer system reading and executing the program recorded in the recording medium. The "computer system" referred to herein includes an OS and hardware such as peripheral equipment. The "computer-readable recording medium" refers to a removable medium, such as a flexible disk, a magnetooptical disk, a ROM or a CD-ROM, or a storage, such as a hard disk incorporated in the computer system, for example. Furthermore, the "computer-readable recording medium" may include an entity that dynamically retains a program for a short time, such as a communication line used when transmitting a program over a network such as the Internet or a communication line such as the telephone line, or an entity that retains a program for a certain time, such as a volatile memory in a computer system that serves as a server or a client when transmitting a program as described above. The program described above may implement only a part of the functions described above, may be able to implement the functions described above in cooperation with a program previously recorded in the computer system, or may be implemented by a programmable logic device such as a field programmable gate array (FPGA).

INDUSTRIAL APPLICABILITY

The present invention can be applied to an optical communication system.

REFERENCE SIGNS LIST 1 crosstalk estimation system
2 monitor light source unit
3 monitor light input unit
4 fan-in
5 transmission line
6 fan-out
7 monitor light separation unit
8 monitor light reception unit
9 signal processing unit
20 monitor light source
21 monitor light source
22 monitor light source
23 PBC
24 monitor light source
25 monitor light source
26 monitor light source
27 monitor light source
28 monitor light source
29 monitor light source
30 optical coupler
31 1×N SW
32 2×N SW
50 multi-core fiber
51 optical amplifier
70 optical coupler
71 N×1 SW
80 multi-wavelength light receiver
100 delay line
101 optical fiber
102 monitor light source
103 BPF
104 Pol.scrm.
105 optical coupler
106 monitor light source
107 monitor light source
108 monitor light source
109 monitor light source
200 signal band
201 auxiliary line
202 auxiliary line
500 core

The invention claimed is:

1. A crosstalk estimation system, comprising:
a light source that generates a polarization-multiplexed light, which is a polarized light having multiplexed polarizations, of each wavelength in a sideband of a modulated signal and emits the polarization-multiplexed light of each wavelength;
a multiplexer that multiplexes the modulated signal with the polarization-multiplexed light for each core, which is associated with one of the wavelengths;
a transmission line that transmits the modulated signal multiplexed with the polarization-multiplexed light of each wavelength through a different core;
a separator that separates the polarization-multiplexed light from the modulated signal multiplexed with the polarization-multiplexed light for each core, and selects the polarization-multiplexed light;
a measurer that generates light intensity data on the selected polarization-multiplexed light of each wavelength; and
an estimator that estimates a crosstalk between the cores based on a difference in light intensity between the selected polarization-multiplexed lights of the wavelengths.

2. The crosstalk estimation system according to claim 1, wherein:
the measurer generates a time average value of the light intensity of the polarization-multiplexed light for each of the wavelengths; and
the estimator estimates a crosstalk between the cores based on a difference in time average value of the light intensity between the polarization-multiplexed lights of the wavelengths.

3. The crosstalk estimation system according to claim 1, wherein the light source generates both a polarization-multiplexed light of a wavelength in an upper sideband of the modulated signal and a polarization-multiplexed light of a wavelength in a lower sideband of the modulated signal.

4. A crosstalk estimation system, comprising:
a light source that generates a polarization-multiplexed light, which is a polarized light having multiplexed polarizations, and emits the polarization-multiplexed light;
a multiplexer that multiplexes a modulated signal with the polarization-multiplexed light for each core, which is associated with a different transmission period;
a transmission line that transmits the modulated signal multiplexed with the polarization-multiplexed light through a different core in each transmission period;
a separator that separates the polarization-multiplexed light from the modulated signal multiplexed with the polarization-multiplexed light for each core;
a measurer that generates light intensity data on the polarization-multiplexed light for each transmission period; and
an estimator that estimates a crosstalk between the cores in each estimation period having a length of time that is an integer multiple of the transmission period based on a difference in light intensity between the polarization-multiplexed lights in the transmission periods.

5. The crosstalk estimation system according to claim 4, wherein:
the light source generates a polarization-multiplexed light for each of different wavelengths in a sideband of the modulated signal; and
the estimator estimates a crosstalk between the cores in each estimation period based on a difference in light intensity between the polarization-multiplexed lights of the wavelengths and the different in light intensity between the polarization-multiplexed lights in the transmission periods.

6. The crosstalk estimation system according to claim 4, wherein the light source generates both a polarization-multiplexed light of a wavelength in an upper sideband of the modulated signal and a polarization-multiplexed light of a wavelength in a lower sideband of the modulated signal.

* * * * *